United States Patent [19]
Orshansky, Jr.

[11] 3,866,490
[45] Feb. 18, 1975

[54] SPLIT POWER TRANSMISSION

[75] Inventor: Elias Orshansky, Jr., San Francisco, Calif.

[73] Assignee: Orshansky Transmission Corporation, New York, N.Y.

[22] Filed: Mar. 15, 1974

[21] Appl. No.: 451,541

Related U.S. Application Data

[63] Continuation-in-part of Ser. No. 443,790, Feb. 19, 1974, and a continuation-in-part of Ser. No. 361,178, May 17, 1973, abandoned.

[52] U.S. Cl. .................................. 74/687, 74/691
[51] Int. Cl. ........................................... F16h 47/04
[58] Field of Search ............. 74/681, 687, 690, 691, 74/720

[56] References Cited
UNITED STATES PATENTS

| | | | |
|---|---|---|---|
| 2,716,357 | 8/1955 | Rennerfelt | 74/691 |
| 2,972,905 | 2/1961 | Bullard | 74/687 X |
| 3,204,486 | 9/1965 | De Lalio | 74/687 |
| 3,212,358 | 10/1965 | De Lalio | 74/687 |
| 3,709,061 | 1/1973 | Orshansky, Jr. | 74/687 |

Primary Examiner—Samuel Scott
Assistant Examiner—John Reep
Attorney, Agent, or Firm—Owen, Wickersham & Erickson

[57] ABSTRACT

A power transmission comprising input means, output means, and a planetary gear assembly having an input member, two output members, and one reaction member. Each said output member is successively connected to drive the output means through a preselected speed range, each output member being disconnected from the output means after the other output member has been connected thereto. Speed-varying means connect one particular output member at all times to the reaction member. For example, the speed-varying means may comprise a friction drive unit, one side of which is connected directly or through gearing to the one output member, while the other side is connected directly or through gearing to the reaction member. Alternatively, a first hydraulic unit is in driving engagement with the reaction member, while a second hydraulic unit is in driving engagement with one output member and is connected to the first unit. In the hydromechanical forms of the invention, one hydraulic unit serves as a pump while the other one serves as a motor, and vice versa; the amount of hydraulic horsepower transmitted is kept low.

73 Claims, 28 Drawing Figures

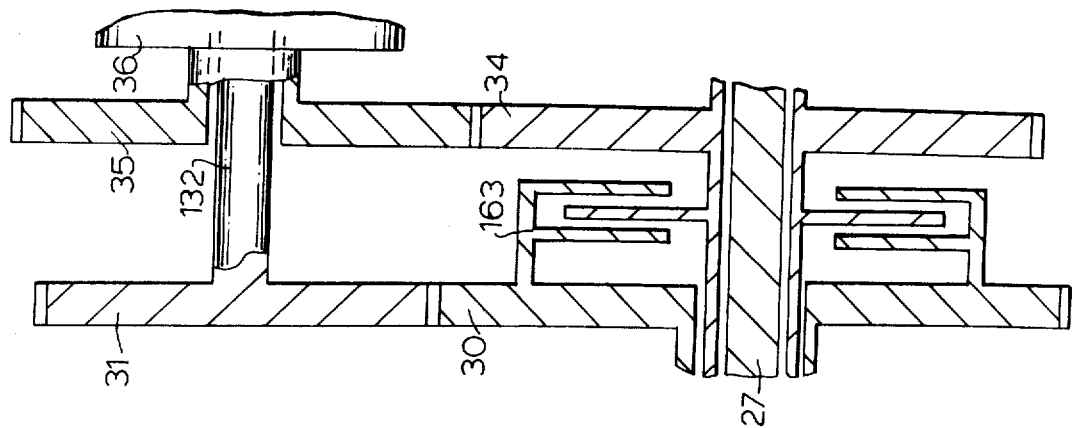
FIG. 20
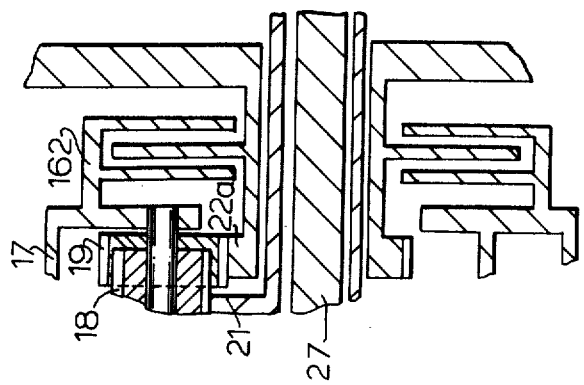
FIG. 19
FIG. 18
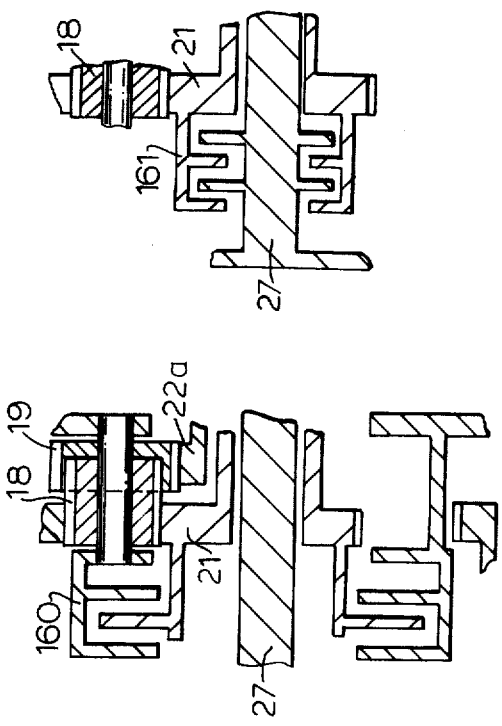
FIG. 16-A
FIG. 17

SPLIT POWER TRANSMISSION

REFERENCE TO RELATED APPLICATION

This application is a continuation-in-part of application Ser. No. 443,790, filed Feb. 19, 1974, which was a continuation-in-part of application Ser. No. 361,178, filed May 17, 1973, now abandoned.

BACKGROUND OF THE INVENTION

This invention relates to an improved split power transmission. A pair of hydraulic units or a variable speed friction-drive unit is employed in connection with a planetary gear arrangement. This transmission is especially useful in trucks and other automotive vehicles.

A purpose of this invention is to provide a commercially producible transmission which enables an improved method of utilizing vehicle engine power. This improved method makes it possible for the engine to operate within a narrow speed range that has been optimized for minimum emissions, maximum fuel economy, and maximum power, regardless of vehicle operating conditions.

Conventional torque converter and manual transmissions have imposed many compromises upon engine systems, due to the requirement of providing adequate performance over a wide range of torques and speeds. The practice of most vehicle manufacturers of offering a selection of optional axle ratios for the vehicle purchaser is but one of many attempts to reduce the compromise for any given application.

With an infinitely variable transmission, an engine can always be operated in a speed range where it is capable of producing rated power; hence, vehicle performance in any given application can be maintained or even improved while utilizing a substantially smaller engine. To accomplish this, the transmission must have high efficiency over a wide range of torque and speed variation. The extent to which any hydromechanical transmission can accomplish this end is strictly a function of the percentage of power which must be transmitted hydraulically. Similarly, in other multiple path transmissions using variable-speed means other than hydraulic variable-speed means (such as a friction drive), the percentage of power transmitted by the variable-speed means largely determines the losses within the transmission.

An analysis of the losses of the transmission indicates that, for a given range of torque and speed variation, the greatest loss in both gears and hydraulic or other variable-speed systems occurs during the recirculative mode. (This is the condition when the variable-speed means recirculates the power within the planetary assembly, so that the total power within the planetary assembly is more than 100 percent of input power.) The least power loss occurs when the transmission is operating in the non-recirculative mode. (This is the condition when the power from the input is split between the purely mechanical patht through the variable-planetary gearing, and the hydraulic (or other variable-speed) path, and then reunited beyond the variable planetary.)

The percentage of power transmitted hydraulically is quite large in many previous hydromechanical transmissions, and a great deal of that power is transmitted, in many such transmissions, by recirculation through the transmission. This was entirely acceptable in a torque variation range of the order of 8:1, but requirements of wider torque variation, such as 14:1, would make too high the amount of hydraulic power transmitted recirculatively, and therefore would impair the efficiency, so that at the point of shift the efficiency would drop quite low.

In one of my transmission inventions, I was able to achieve the elimination of recirculative power, but the practicality of construction was greatly lowered due to the profusion of centerlines and shafts. The present invention achieves greater simplicity of construction and reduces the size of hydraulic units involved while still eliminating recirculative power or by recirculating only a small portion of power.

Thus, an important object of this invention is to keep low the amount of horsepower transmitted in the various ranges by the speed-varying means.

The invention provides, in its hydromechanical embodiments, for minimum hydraulic power transmission while avoiding complexity, excessive speed and high loads in the gera trains. Maximum reliability and minimum cost can be obtained, by utilizing standard commercial hydraulic units which are operated within their long-life rated conditions of speed and power. In addition, the clutches can be of the low-cost types presently employed in high production automobile torque-converter transmissions. For a comparable power rating, a smaller number of friction elements can be utilized in clutches than in a power-shift transmission, due to the fact that at all shift points the clutch elements are virtually synchronous. The number of elements is therefore a function not of their thermal capacity but of their steady-state torque capacity.

Similar results can be obtained with friction-drive units replacing the hydraulic units.

By applying the transmission of this invention to a piston engine, exhaust emissions can be reduced, and the specific fuel consumption can be improved, the engine programming theengine to operate within its optimum range under all road load conditions. In addition, the invention enables the use of a smaller engine for any application, as the transmisson will allow full engine power to be developed at any vehicle speed except for the lower speeds where the vehicle is traction limited.

These same considerations also apply to a rotary combustion chamber engine.

Benefits are also derived from the application of this type of transmission to a gas turbine. The major drawback in producing such turbines today is their cost of manufacture, and this cost is, to a large degree, a function of the complexity necessitated by the design of a turbine for use under the varying torque and speed requirements of a road vehicle. The single-shaft type of turbine is not only more economical to manufacture than the two-shaft design normally proposed for vehicle application, but it is also more efficient if operated within the band of its maximum efficiency. With the transmission of this invention, a turbine can be programmed to operate only under those conditions during which it is most efficient.

The transmission of this invention is applicable to many fields, including passenger cars, highway trucks, and off-the-highway trucks, agricultural equipment, construction equipment, military vehicles, and industrial drives.

Another important feature of the hydromechanical forms of the invention is their provision of a hydromechanical start and a hydromechanical reverse, in place of a hydrostatic start and a hydrostatic reverse. The hydromechanical start protects the hydraulic system from overpressure, because at the start the maximum pressure is a function of engine torque. In hydrostatic start there has to be an elaborate system of protection against overpressure, because the hydraulic system is capable of developing extremely high pressures near zero displacement of the pump, even with very low engine input torque.

SUMMARY OF THE INVENTION

The power transmission of this invention provides a planetary gear asembly having one ring gear, one planet carrier carrying a first planet gear set and a second planet gear set that are intermeshed, and first and second sun gears. The input may be either the ring gear or the planet carrier, and the one not used as an input serves as one of two output members, the other one being a sun gear while a second sun gear serves as a reaction member. Speed-varying means at all times connects a particular one of the output members to the reaction member, either directly or through gearing.

In the hydromechanical form, a first hydraulic unit is in driving engagement with the reaction member, while a second hydraulic unit is in driving engagement with the one particular output member and is hydraulically connected to the first hydraulic unit, one hydraulic unit serving as a pump while the other one serves as a motor, and vice versa.

In other forms of the invention, the speed-varying means may be a friction-drive unit.

The invention provides means for successively connecting each output member to drive an output means through a preselected speed range and means for disconnecting each output member from this output means after the other output member has been connected thereto.

Another feature of the invention is the use of a reduction gear train, which in the lowest speed range or speed ranges and in the reverse speed range or speed ranges, is connected to the output means (such as the final output shaft) between the output means and the two output members of the first planetary assembly. This reduction gear train may comprise a second planetary assembly in which the output members are clutched respectively to a sun gear and in which the planet carrier carries planet gears meshed to the sun gear and is connected to the output shaft. A ring gear which is also meshed to those same planet gears is provided with a brake band or other means for holding the ring gear stationary, when that is desired. Also, for reverse, there may be a second set of planet gears meshed to the first set and carried by the same planet carrier. There is no sun gear going to this particular set of planet gears, but there is a ring gear again, and the ring gear is once again connected to a clutch or brake which enables this second ring gear to be held stationary during reverse operations. Other types of reduction gear trains may be used.

BRIEF DESCRIPTION OF THE DRAWINGS

In the drawings:

FIG. 2A is a table showing which clutches are engaged in which speed ranges.

FIG. 7A is a table showing which clutches are engaged in which range in operation of the transmission of FIG. 7.

FIG. 8A is a diagram showing which clutches are engaged in which speed range in the device of FIG. 8.

FIg. 9A is a diagram showing which clutches are engaged and which speed range in the device of FIG. 9.

FIG. 11A is a clutch engagement diagram for FIG. 11.

FIG. 12A is a clutch engagement diagram for FIG. 12.

FIG. 13A is a clutch-engagement table for the transmission of FIG. 13.

FIG. 16A is a clutch engagement diagram for the transmission of FIG. 16.

FIGS. 17–20 are fragmentary detail views showing other means for clutching together two members of the main planetary gear assembly.

FIG. 17 is a fragmentary view in section of a clutch for locking together the output sun gear and the carrier, showing some adjacent parts.

FIG. 18 is a similar view incorporating a clutch for locking together the output sun gear and the output ring gear.

FIG. 19 is a similar view incorporating a clutch for locking together the carrier and the reaction sun gear.

FIG. 20 is a similar view incorporating a clutch for locking together the reaction sun gear and the output sun gear.

DETAILED DESCRIPTION OF SOME PREFERRED EMBODIMENTS

The Four-Stage Transmission of FIGS. 1–4:

FIGS. 1–4 show a transmission 10 which is especially well-adapted for use by heavy trucks including off-the-road vehicles. There are four stages, and two of these operate in starting and at low speeds.

Figure 1:
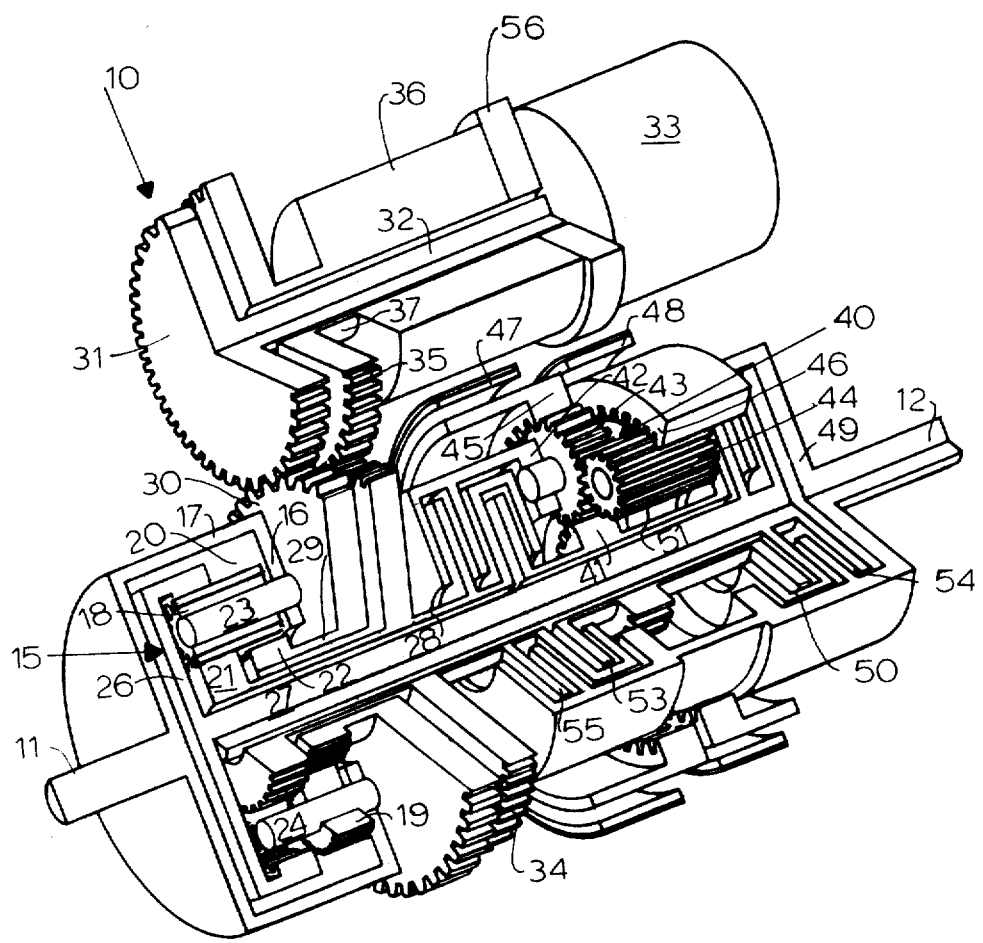
FIG. 1 is a view in perspective, partially cut away, of a power transmission embodying the principles of the invention. Instead of showing the cutaway parts in section, they are shown only in outline and the internal parts of the hydraulic units are not shown. In this form of the invention the input member of the first and main planetary assembly is a planet carrier with the two output members being a ring gear and a sun gear, both meshed to the same set of planet gears.
Figure 2:
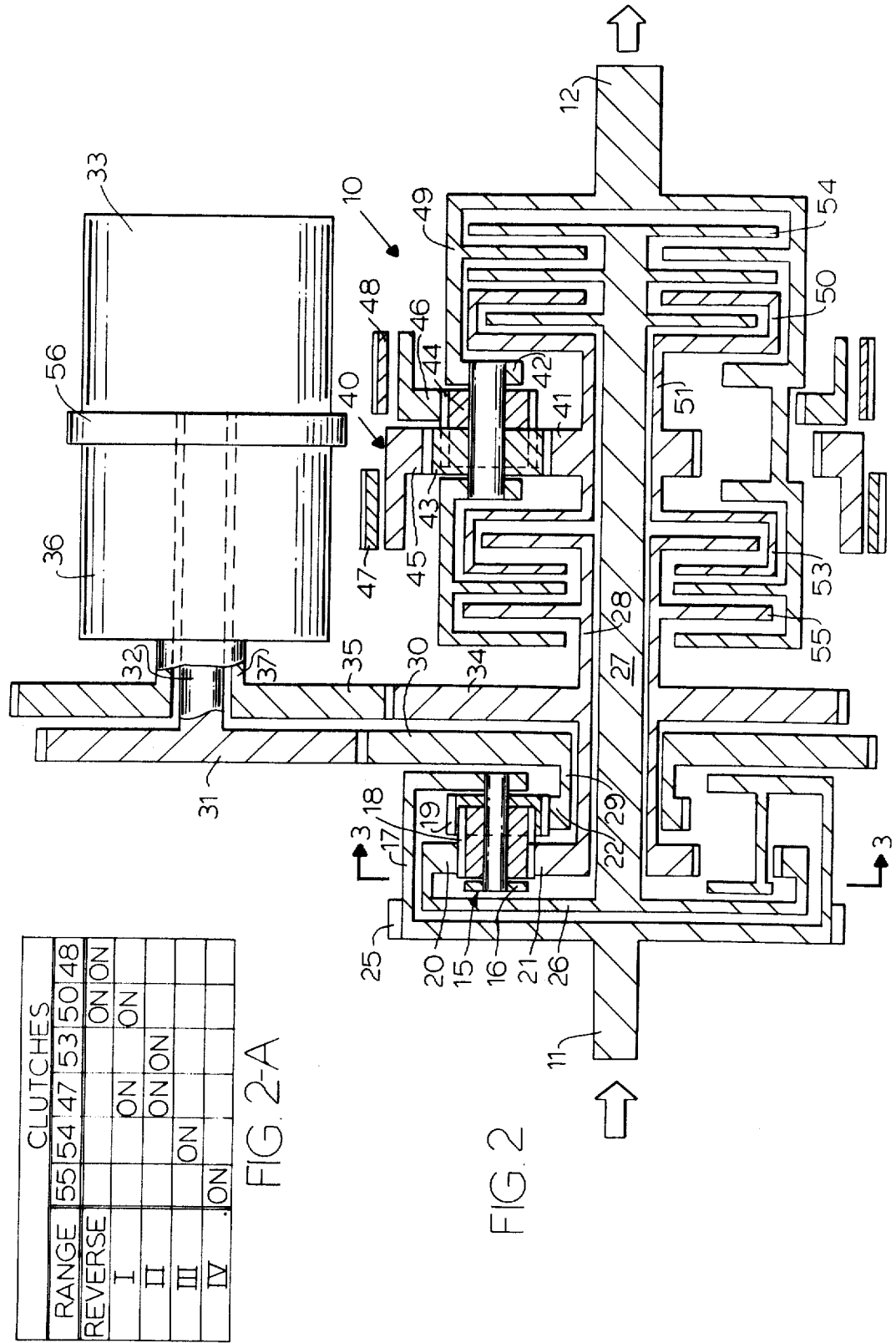
FIG. 2 is a schematic diagram of the transmission of FIG. 1.
Figure 3:
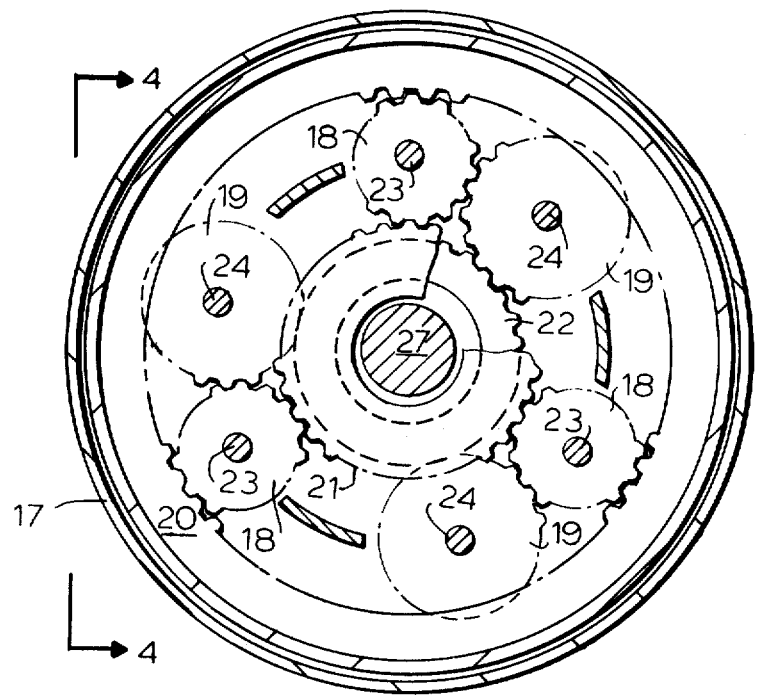
FIG. 3 is an enlarged view in section and somewhat more representational, taken along the line 3—3 of FIG. 2.
Figure 4:
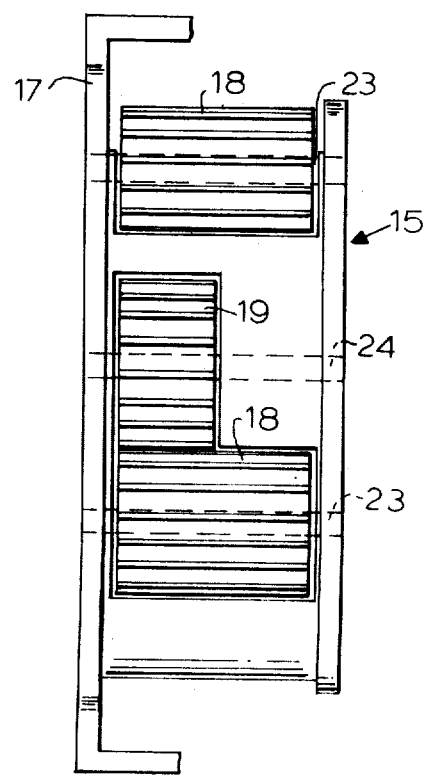
FIG. 4 is a view taken along the line 4—4 in FIG. 3, showing only the carrier and its planet assembly with some parts broken away and other parts removed.

An input means such as an input shaft 11 rotating at constant speed or at programmed speeds is used to drive an output means such as an output shaft 12 at a wide variety of speeds by use of the transmission 10 of this invention. In FIGS. 1 and 2, the transmission 10 comprises a planetary gear assembly 15 having a planetary carrier 16 which serves as the input member to the planetary assembly 15, being connected to the input shaft 11 by the connection 17. The planetary carrier 16 carries two sets of planetary gears 18 and 19 which are intermeshed with each other, as is shown best in FIG. 3.

The output from the planetary gear assembly 15 is dual; in other words, there are two output members in this exemplary structure. One of these output members is a ring gear 20, which is in mesh with the planet gears 18; the other output member is a sun gear 21, which is also in mesh with the same set of planet gears 18. Finally, there is a reaction member, which here is a sun gear 22, and the sun gear 22 is in mesh with the other set of planetary gears 19. The planet gears 18 and 19 have separate shafts 23 and 24 for each one of these gears, but all of them are carried by the same carrier 16 so that they serve to transmit the input from the input shaft 11 and the carrier 16 to both output gears 20 and 21 and to the reaction gear 22.

For convenience in auxiliary operations, there may be a power takeoff member or gear 25 (see FIG. 2, not shown in FIG. 1) which is driven by the member 17 that connects the planet carrier 16 to the input shaft 11. This gear 25 may also drive an auxiliary hydraulic pump (not shown) for lubrication, cooling, and charging of the main hydraulic system.

The ring gear 20, which is one of the two output members, is connected by a radially extending member 26 to a central shaft 27 which is coaxial with the input shaft 11 and the output shaft 12. In fact, as will be noted, all members of the planetary assembly 15 (except the planet gears themselves and their shafts) are coaxial to the same axis. The sun gear 21, which is the other output member, is in this instance connected to a coaxial hollow shaft 28.

The sun gear 22, which is the reaction member, is connected to another hollow shaft 29 which is concentric to the shafts 27 and 28 and in this instance is shown as lying outside them. The shaft 29 is connected to a gear 30, which in turn engages a gear 31, and the gear 31 is connected to an auxiliary shaft 32, which is connected in driving relation to a hydraulic unit 33 of variable stroke.

The shaft 28, which is driven by the sun gear 21, is connected to a gear 34, which, in turn, is meshed with a gear 35. The gear 35 is mounted on a hollow shaft 37 that is concentric with the shaft 32. This shaft 37 is connected in driving relationship with a hydraulic unit 36, also having a variable displacement. The two hydraulic units 33 and 36 are hydraulically connected together, so that when the unit 36 acts as a pump, the unit 33 acts as a motor and vice versa. In the operation of this device these two units change operation: one will operate as a pump while the other operates as a motor; then at a certain point they will shift, and the one formerly operating as a pump will then be operating as a motor, and the one formerly operating as a motor will then be operating as a pump. The changes in speed of the output shaft 12 in each range are due to the operation of these hydraulic units 33 and 36; within each range, the displacement of one unit relative to that of the other unit is caused to change, and this results in a speed change within the planetary asembly 15 from a minimum speed for that range to a maximum speed for that range; at a maximum speed or a minimum speed a shift may be made to another range.

Thus, it will be seen that one characteristic of the present invention is that the reaction gear, here the sun gear 22, is always connected to one of the two hydraulic units, namely, the unit 33; and that one of the output members, in this instance the sun gear 21, is always connected to the other hydraulic unit 36.

A reduction gear train 40 is also provided in this invention, and it may comprise a second planetary assembly. The reduction gear assembly 40 is shown here having a sun gear 41, a planet carrier 42 carrying a first set of planet gears 43, and a second set of planet gears 44, the planet gears being intermeshed with each other along substantially the same principles as the intermeshing of the planet gears 18 and 19. The unit 40 has two ring gears, a ring gear 45 which meshes with the planet gears 43 and a ring gear 46 which is meshed with the planet gears 44. The ring gear 45 and the planet gears 43 are utilized in the forward speeds for starting and low speeds, while the ring gear 46 and the planet gears 44 are utilized in reverse speeds.

In connection with the ring gear 45, there is a brake band 47 which can be tightened against the outer periphery of the ring gear 45 or to a member connected to the ring gear 45 to stop it or to tie it to the housing so that the ring gear 45 is held stationary relative to the housing which carries the assembly. Similarly, a brake band 48 is actuable to bring it against the outer periphery of the ring gear 46, which is the reverse gear, to hold that gear stationary. Since the planet gears 43 are the only planet gears which engage the sun gear 41 and since the planet gears 44 are in mesh with the planet gears 43, it will be clear that the ring gear 46 operates in the opposite direction from that of the ring gear 45.

Thus, the input for this second planetary or reduction gear assembly 40 is the sun gear 41, and the output member is the planet carrier 42, which is connected by a connection 49 to the final output shaft 12.

A set of clutches is provided to make the transition from one speed stage to another by shifting. In each case, the gear to be engaged is engaged before the gear to be disengaged is disengaged, and they both run briefly at simultaneous speeds--in other words, the shifting is substantially synchronous. Each of the output members 20 and 21 has two clutches associated with it, one for use in the starting and low speeds and the other for use in the higher speeds. Each of the clutches has one member operatively connected to an output member 20 or 21 and another member connected to either the sun gear 41 or to the mmember 49, which is directly connected to the output shaft 12.

The first and lowest speed range (Range I in FIGS. 2A, 5, and 6) is obtained by engaging a clutch 50 which connects the solid shaft 27 (and therefore the output ring gear 20) to the sun gear 41 via a hollow shaft 51 and also by engaging the brake band 47 to engage the ring gear 45 and hold it stationary. As the hydraulic units 33 and 36 act to increase the speed of the output shaft 12 within the stage operated by the clutch 50 and the brake 47, when the maximum speed is reached it becomes possible to shift synchronously to the second low-speed stage (Range II), in which a clutch 53 connects the shaft 28 to the sun gear 41. Thereafter, the clutch 50 is disengaged but the brake band 47 remains engaged with the ring gear 45.

As the speed increases within this second low-speed stage (Range II), the point is reached where a new speed range can be shifted into, a maximum speed within the second range having been reached. To go to the third range (Range III in FIGS. 2A, 5 and 6), a clutch 54 is engaged, which connects the solid shaft 27 (and therefore the ring gear 20) directly to the output shaft 12, and thereafter the clutch 53 is released, as is also the brake 47, which is the brake band lining which up to this time held the ring gear 45 stationary. The drive is now direct, and in this third stage the speed increase is obtained again through the hydraulic system, until once again a shift becomes practical. In this instance, a clutch 55 is engaged to transmit power directly from the output gear 21 and its shaft 28 to the final output shaft 12. Thereafter the clutch 54 is released. Speed increases within this Range IV carry the final output shaft to its ultimate final speed.

In reverse, operation is quite similar except that in place of using the brake band 47 to hold the ring gear 45 in a stationary position, the brake band 48 is used to hold the ring gear 46 stationary. In this instance, the transmission from the sun gear 41 to the planet gears 43 is continued through the intermeshed planet gear 44 and the direction is therefore reversed, so that the planetary carrier transmits the drive to the final output shaft 12 in the reverse direction. The start in reverse is made by engaging the brake 48 and the clutch 50; if a higher speed reverse is desired, then, after maximum speed in the lowest reverse range has been achieved by use of the clutch 50, it is possible synchronously to engage the clutch 53 and then disengage the clutch 50. It is, of course, evident that there would be no possibility of any reverse in the structure shown in FIG. 1 with speeds other than the two lowest speed ranges. Further modifications would have to be made for that.

The two hydraulic units 33 and 36 are preferably placed back-to-back with a transfer member 56 separating them and containing the conduits transferring oil between the hydraulic units 33 and 36. As already stated, the hydraulic unit 33 is driven by the shaft 32, which may be a telescoping shaft or quill that fits through the cylindrical opening in the shaft 37 for the hydraulic unit 36.

Several advantages are obtained in this invention by connecting the one hydraulic unit 33 always to the gear 22, which always serves as a reaction gear, and in connecting the other hydraulic unit 36 to one output member 21, which is connected via the planetary gears 18 to the other output member 20. Since there is no connection of a hydraulic unit to an input unit as in some of my previous patent applications, different conditions prevail. The power split may be somewhat complicated, but a characteristic is that the power which flows through the hydraulic units 33 and 36 and that goes eventually to the output unit 12 remains additive rather than recirculative, except at a very few small areas where it can, fortunately, be tolerated. As I have shown in my U.S. Pat. No. 3,709,061, it is possible to eliminate completely this regenerative or recirculative power, but it will also be seen there that this is done only at the cost of having a relatively complex clutching structure, whereas in the present invention a much simpler clutching structure can be used while still eliminating recirculative power or holding it to a very small amount (depending on gear ratios) and while locating the recirculative power, if any, where it is held to minimum disadvantage.

Since the hydraulic unit 33 is either a pump or motor, while the unit 36 performs the opposite function, the reaction gear 22 may be running faster than the carrier 16, or it may be running slower. When the reaction gear 22 runs in the same direction as the carrier 16, then the hydraulic unit 33 acts as a motor in Ranges I and III (see FIG. 5), and when the reaction gear 22 runs in the opposite direction from the carrier 16, then the hydraulic unit 33 connected to it acts as a pump in Ranges I and III. In Ranges II and IV, the opposite takes place. In the position in which the reaction gear 22 stands still or is at approximately zero speed, the hydraulic unit 33 associated with it is at its maximum displacement, and the hydraulic unit 36 is at zero displacement. In that case, no hydraulic power is transmitted. If the gear ratios are such that the gear 22 never changes direction of rotation, there is no recirculative power at all.

Starting from a point where zero hydraulic power is transmitted and the gear 22 is standing still, operations are started, and it will be seen that the output ring gear 20 is used in the lowest speed range, Range I, for starting. As the reaction gear 22 runs in one direction, the gear 20 slows down, and then if there is some recirculative power, as the gear 22 runs in the opposite direction the gear 20 speeds up. As noted at the start, the output ring gear 20 is connected by the clutch 50 to the final output planetary sun gear 41, enabling a high gear ratio for start. As the gear 20 speeds up through the action of the gear 22 (which gradually slows down and comes to a stop, or even reverses its direction if some recirculative power is used), the speed of the final output shaft 12 increases. Simulltaneously, the speed of the other output gear 21 is decreasing.

At some point, the speeds of the gears 20 and 21 will be equal, and at that point it is possible to engage the clutch 53, and then soon thereafter to disengage the clutch 50 and shift into the second starting range, Range II. The speed increase continues in the same manner described, until at some point the speed of the gear 20 and of the shaft 27 reach the same speed as that of the final output shaft 12. At that point, the next shift may be made into Range III by engaging the clutch 54 and simultaneously disengaging the clutch 53 and also the brake band 47. The further increase in speed within this third range goes until the shaft 28 is running at the same speed as the output shaft 12, and then, once again, the shift may be made (to Range IV) by engaging the clutch 55 and immediately therefter disengaging the clutch 54. This fourth range goes on to the maximum speed of the output shaft 12.

While all this is taking place, there is an absolute minimum of recirculative power, showing the practicality of having this simple structure. The percentage of hydraulic horsepower transmitted throughout the entire range is very, very small. In the top range, for instance, at 35–65 miles per hour, the percentage of hydraulic power is about 18 percent at 35 miles per hour, nearly zero at about 50 miles per hour, and only 13 percent at 65 miles per hour. If no recirculative power is used, the percentages are somewhat higher, but the pressures are generally lower, giving improved overall efficiency. The bulk of the operating time of a truck would be spent within this speed range, and therefore very favorable fuel consumption and emissions would be obtained.

The transmission is also very efficient in the low ranges at the start, because the start occurs with both the mechanical system and the hydraulic system driving the truck from the beginning, rather than employing a hydrostatic system alone, the efficiency of which would be about 75 percent at the most. Consequently, the transmission of this invention is suited not only for long-haul trucks which operate most of the time at a high range of speed, but also for off-the-highway trucks, which do the bulk of their work in the low range of speed and where this transmission 10 is equally efficient.

The hydromechanical start necessitates the use of the reverse gear shown, but this is a small price to pay. By the structures shown it is possible to go into reverse using the same final drive planetary assembly 40 with its supplemental gears 44 and 46 as the reverse gear.

In the structures shown in FIGS. 1–4, both hydraulic units 33 and 36 are of variable displacement. This means that they can be made of smaller size. As will be seen in the structures shown in FIG. 7, one of the hydraulic units may be a fixed displacement unit. That avoids the extra complication of varying the one unit, but it means that in any event if one of the units is to be fixed, the fixed one must be connected to the reaction gear.

Figure 5:
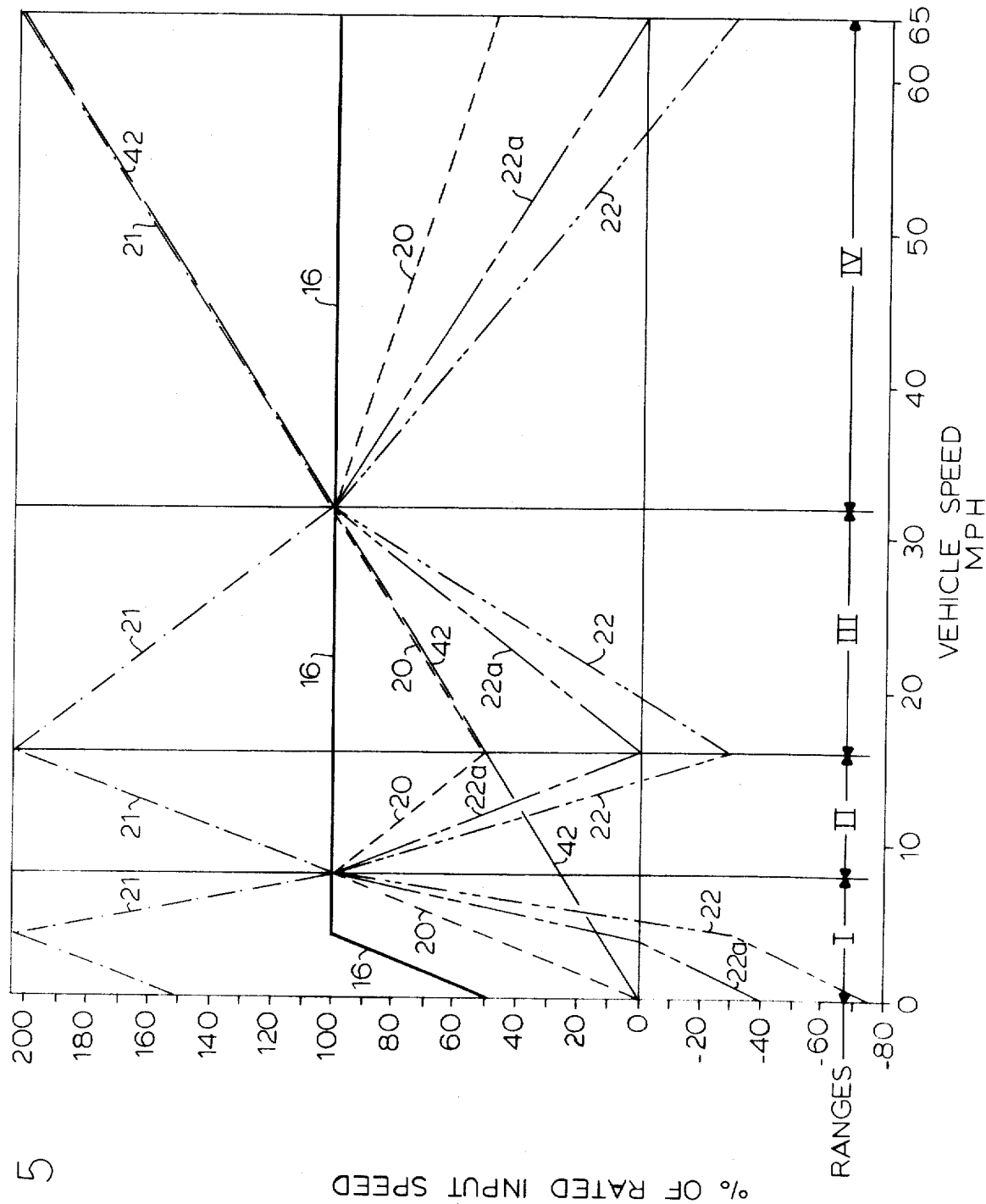
FIG. 5 is a speed lines diagram for the transmission of FIGS. 1-4.
Figure 6:
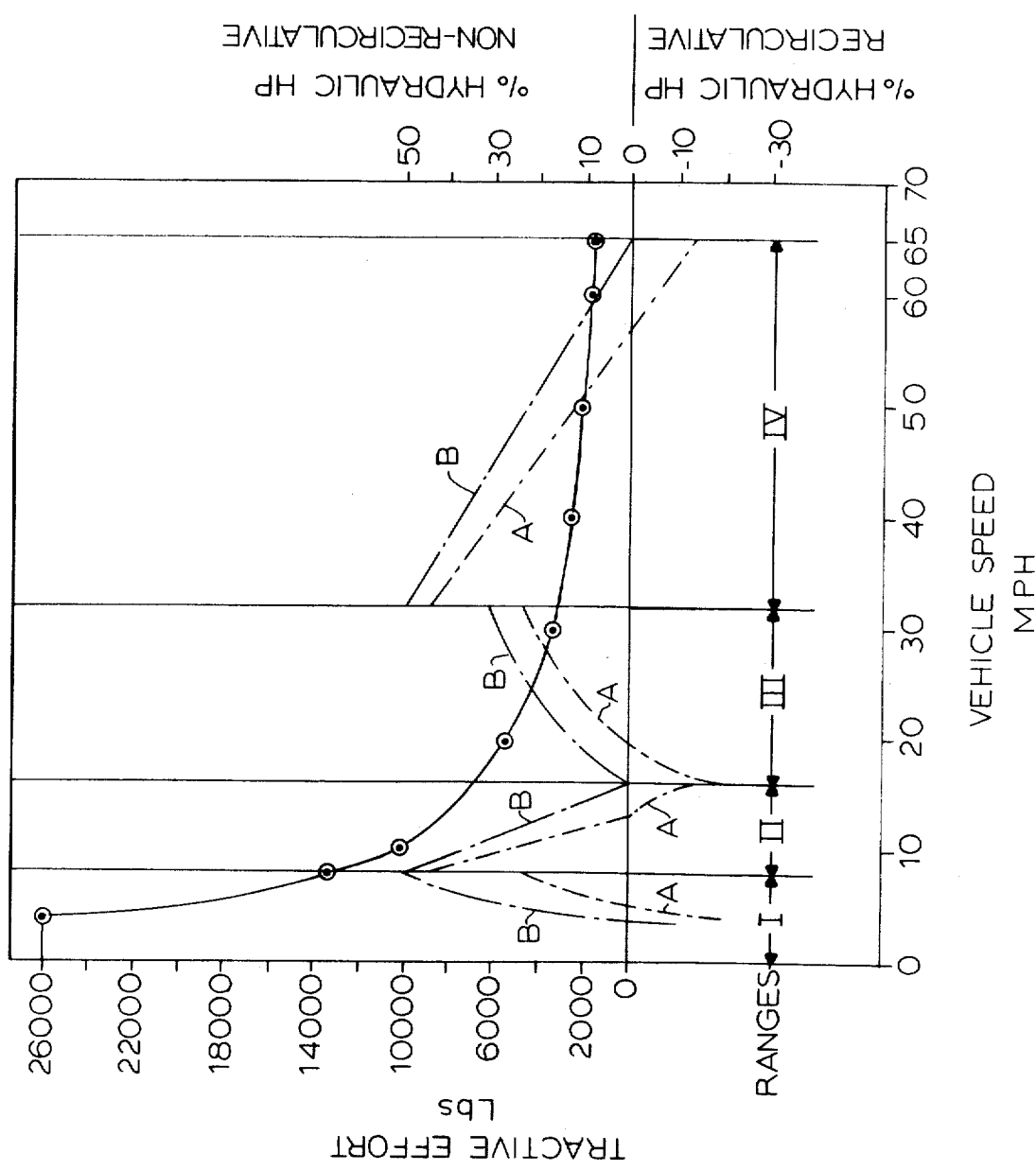
FIG. 6 is a diagram of tractive effort and percent hydraulic horsepower for various vehicle speeds for the trahsmission of FIGS. 1-4.

The lines diagrams, FIGS. 5 and 6, show the operation of this transmission in all of the forward speeds, and it will be understood that the reverse speeds are a mirror image of what goes on in Ranges I and II. The diagram of FIG. 5 shows the forward speed ranges plotted against the speeds of the planetary members expressed as the percent of the rate of input speed, with the actual road speed per mile for a particular truck being shown as the horizontal scale for the four ranges. A study of these diagrams shown exactly what is going on in this transmission 10. When recirculative power is used, the line 22 applies in FIG. 5, and the line 22A applies when no recirculative power is used.

FIG. 6 shows two things: the tractive effort and the percent of hydraulic horsepower, both plotted against the vehicle speed. The tractive effort is a smooth curve, whereas the percent of hydraulic horsepower is a curve which has discontinuities. The portions of line A below the zero speed and going under the minus speeds show the percent of hydraulic horsepower that is recirculative, and it will be seen that this occurs at very few points and then is less than 20 percent, which is permissible. When no recirculative power is used, line B applies.

Figure 7:
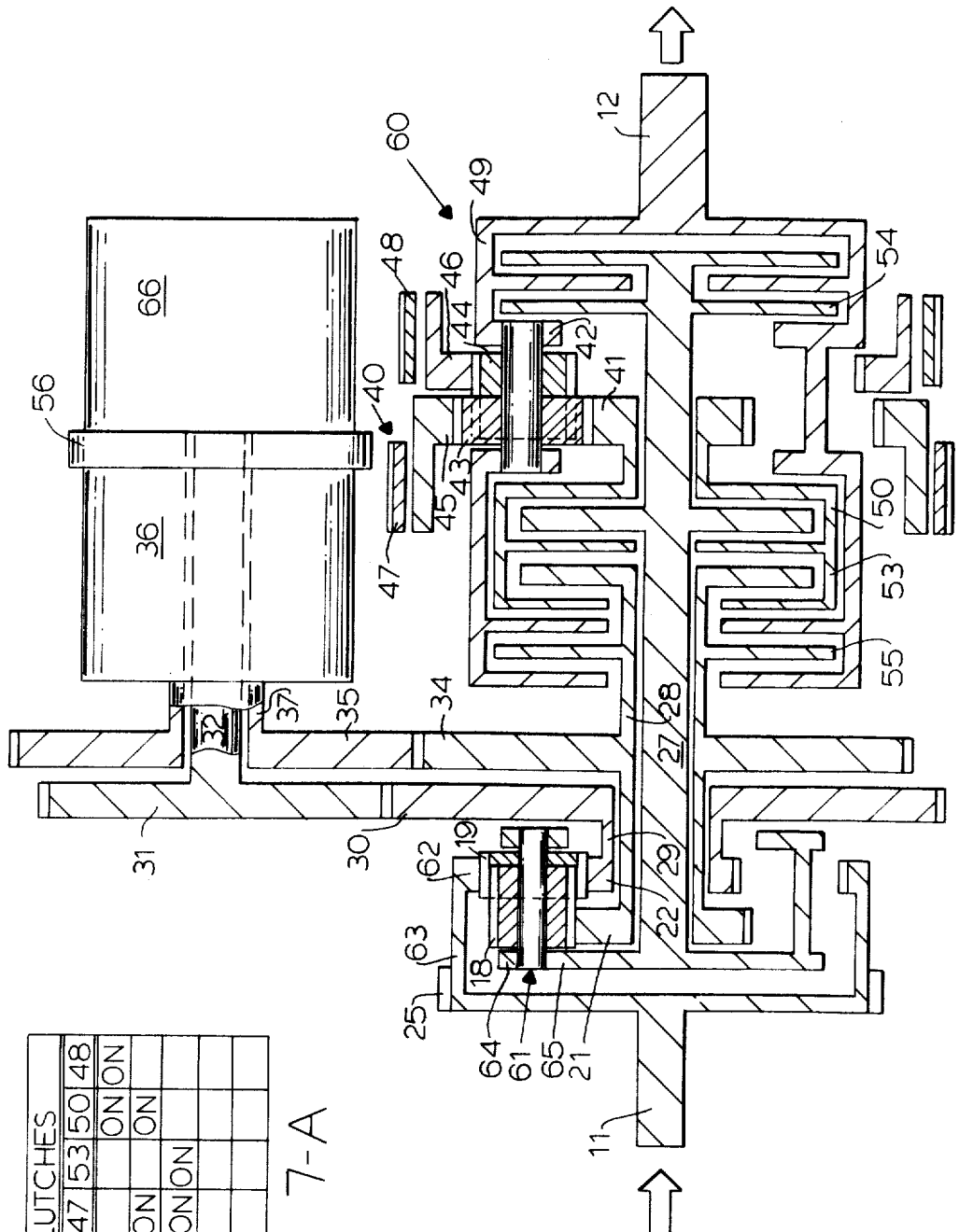
FIG. 7 is a view similar to FIG. 2 of a modified form of transmission embodying the principles of the invention, in which the input member is a ring gear and the output members include the planet carrier as well as the sun gear.

An Embodiment of a Four-Range Transmission With a Different Input and Output Arrangement (FIGS. 7 and 7A):

There are relatively few differences between the transmission 60 of FIG. 7 and that of FIG. 2. Therefore, most of the members that are attained are identical and are shown by identical reference numerals. The somewhat different appearance of the clutching arrangement makes no difference since it is merely a diagrammatical matter.

In the transmission 60 of this form of the invention, a planetary assembly 61 in which a ring gear 62 is employed as the input member is connected by a member 63 to the input shaft 11. A carrier 64 functions, so far as its carrier function is concerned, exactly as the carrier 16. It is, however, used as an output member and is connected to the central shaft 27 by a member 65. The only other difference is that, for purposes of illustration, a fixed displacement hydraulic unit 66 is used in place of the variable-displacement hydraulic unit 33. This fixed displacement unit 66 could be used in the form of the invention shown in FIGS. 1–4 by making only that change, and in the transmission 60 a variable-displacement unit 33 could be used by making only that change. The advantages and disadvantages of doing so have been already discussed.

Operation is basically the same, so far as all the ranges are concerned, with the simple difference that the ring gear 62 is always serving as the input and that the carrier 64 is one of the two outputs replacing the function of the ring gear 20 of FIG. 2 for that purpose. The speed lines diagrams of FIGS. 5 and 6 are substantially identical for the unit in FIG. 7; FIG. 7A describes the clutching sequence, which, again, is the same. However, in the form of the invention shown in FIG. 7, more power is transmitted hydraulically in the high-speed end of Ranges I and III than in the form of the invention shown in FIGS. 1–4, and in the low-speed end of FIG. 7 device transmits less power hydraulically than the device of FIGS. 1–4.

Figure 8:
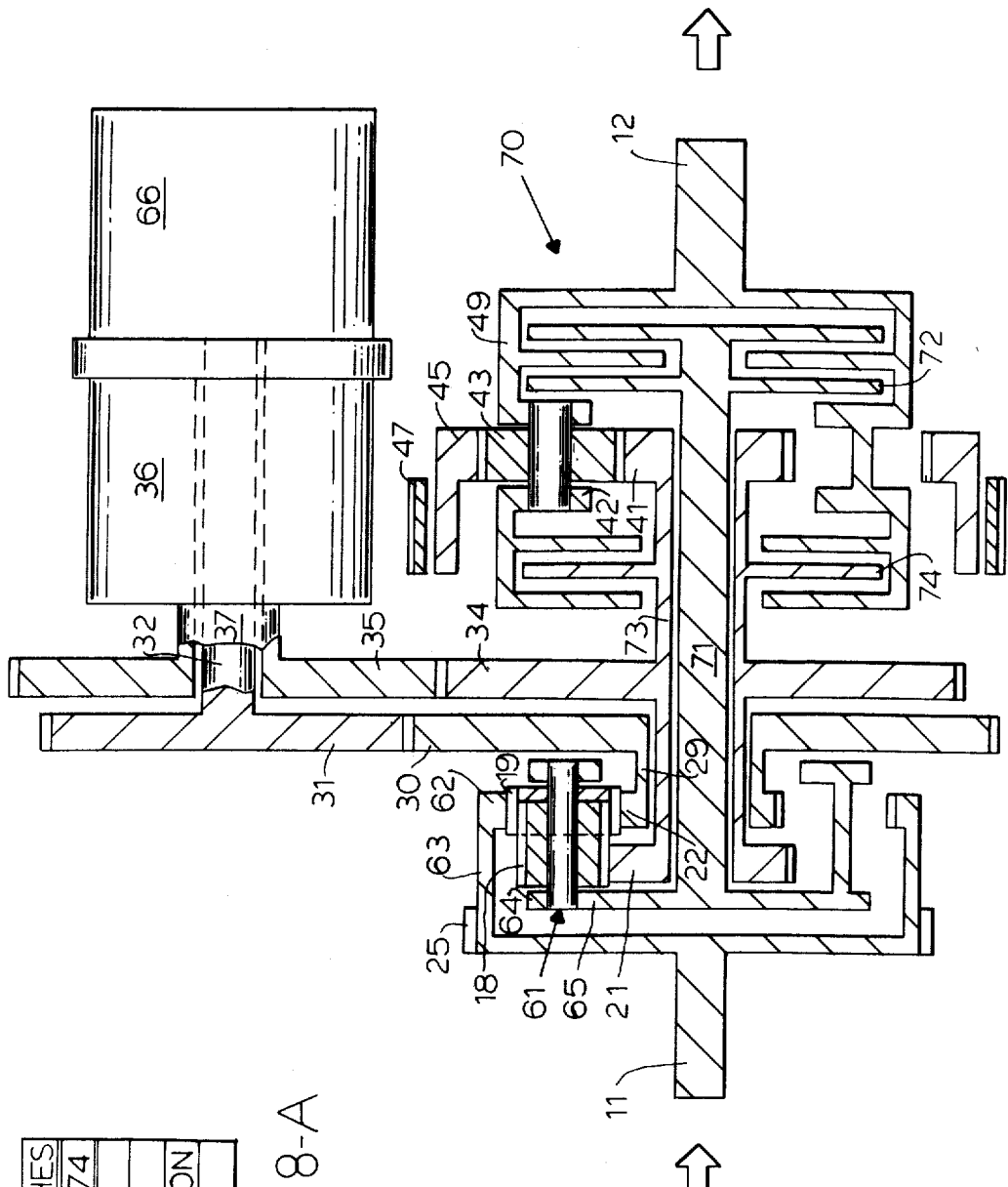
FIG. 8 is a view similar to FIG. 2 of a modified form of invention in which there is only one starting range and one reverse range, so that, so far as forward speeds are concerned, there are only three forward speed ranges.

A Simpler Transmission Having Three Forward Speeds (FIGS. 8 and 8A):

FIG. 8 shows a transmission 70 which is substantially identical to the transmission 60 of FIG. 6, except that some of the clutches are omitted with attendant advantages and disadvantages. The planetary gear assembly 61 is identically the same, as is the hydraulic assembly 36, 66 etc., the only difference being the omission of some of the clutches to have three speeds forward.

The output from the carrier 64 through the member 65 goes to a shaft 71. The shaft 71 is connectable by a clutch 72 to the output shaft 12. The output from the sun gear 21 goes to a shaft 73 which has mounted on it the sun gear 41. The shaft 73 is also clutchable by a clutch 74 to the carrier 42 and therefore to the output shaft 12.

In the lowest range of speed (Range I of FIG. 8A) only the brake 47 is engaged, being engaged with the ring gear 45 (or a member connected thereto) to hold the ring gear 45 stationary, and power is therefore applied through the sun gear 41 and from there via the carrier 42 to the member 49 and thence to the output shaft 12. This is the single low or starting range (Range I), for this particular transmission. Reverse is accomplished by adjusting the relative displacements of the hydraulic units 36 and 66 in such a way that they both run even faster than they do at zero output speed of the final output shaft 12, thereby causing the shaft 12 to reverse and run in the opposite direction from its forward speed.

When the speed of this lowest range (Range I) reaches the speed of the output shaft 12, then the clutch 72 is engaged and the brake 47 is disengaged to give Range II. Range III is obtained at a later synchronous shift at which the clutch 74 is engaged and the clutch 72 is disengaged. Operation is basically what has already been described.

Figure 9:
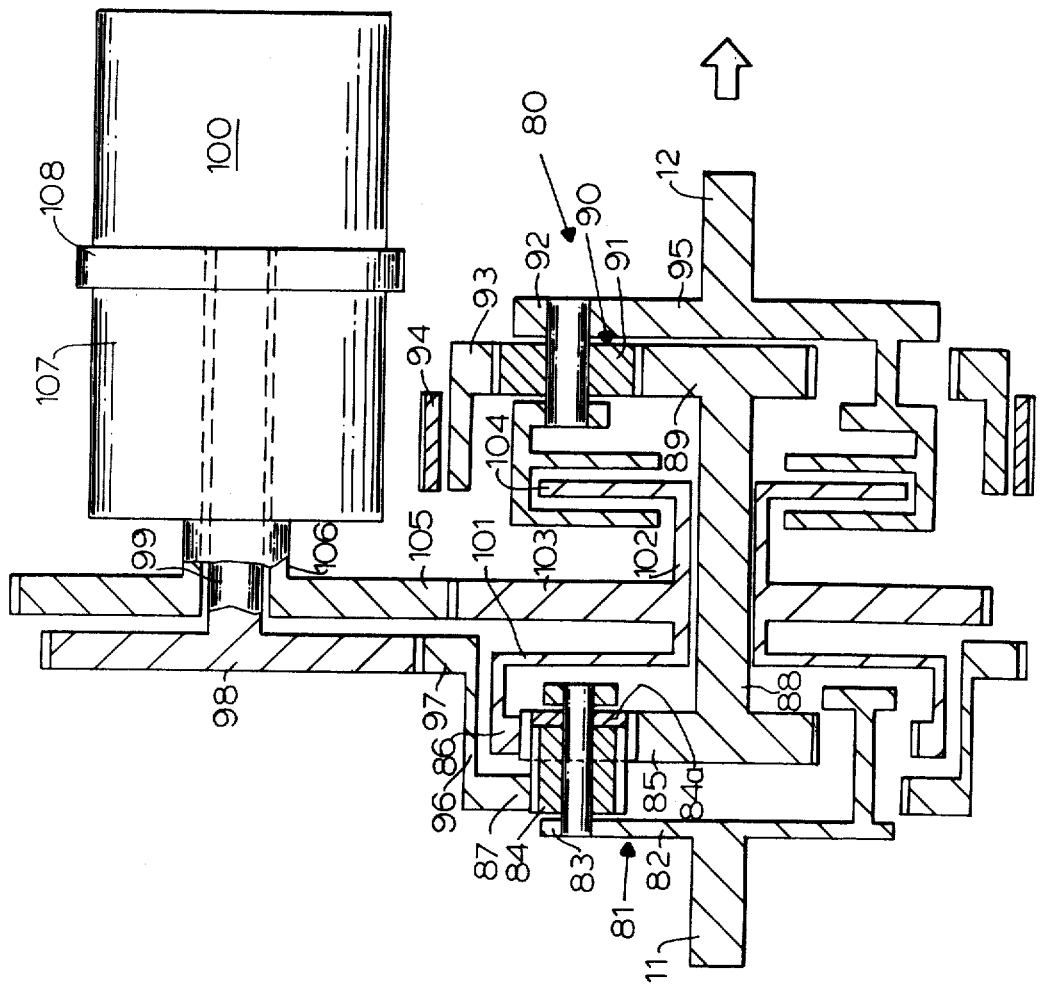
FIG. 9 is a view similar to FIG. 2 of another modified form of the invention, in this instance having only two speeds forward and utilizing a ring gear as the reaction gear.

A Transmission 80 Having Only Two Ranges (FIGS. 9, 9A and 10):

FIG. 9 shows a transmission 80 having only two forward ranges and employing a different type of reaction system. In this instance, the input shaft 11 is connected to the output shaft 12 through a planetary assembly 81. The input to the planetary assembly 81 is from the input shaft 11 via a radial member 82 to a carrier 83. The planetary carrier 83 carries a first set of planet gears 84 and a second set of planet gears 84a. The planet gears 84a are meshed to two output gears, one of these being a sun gear 85 and the other having a ring gear 86. The planet gears 84 are meshed to a reaction gear, which in this instance is a ring gear 87.

The sun gear 85 is mounted on a shaft 88 which has mounted on it a sun gear 89, which is part of a second planetary assembly 90. The planetary assembly 90 has planet gears 91 engaging the sun gear 89 and carried by a carrier 92. The planet gears 91 also engage a ring gear 93, and there is a brake 94 secured to the stationary housing, which is adapted to hold the ring gear 93 stationary when the brake 94 is engaged. The carrier 92 is connected by a radial member 95 to the output shaft 12.

The reaction ring gear 87 is connected by a member 96 to a gear 97, which is meshed with a gear 98. The gear 98 is mounted on a shaft 99 on which is also mounted a hydraulic unit 100.

The output ring gear 86 is connected by a member 101 to a shaft 102 having a gear 103 mounted thereon and also is clutchable to the carrier 92 by a clutch 104. The gear 103 is in mesh with a gear 105, which is mounted on a hollow shaft 106. The shaft 106, in turn, supports another hydraulic unit 107. A plate 108 carrying the transfer conduits from one hydraulic unit 100 to the other hydraulic unit 107 lies between these two units 100 and 107.

The output sun gear 85 is used for the low speed, acting through the shaft 88 and sun gear 89, and the ring gear 93 is held stationary by the brake 94 being engaged, so that output proceeds from the sun gear 85 and shaft 88 to the sun gear 89 and the planet gears 91 and thence to the carrier 92 and from there to the output shaft 12.

The second speed is obtained by disengaging the brake 94 after engaging the clutch 104. In this instance the power is transmitted from the output ring gear 86 through the shaft 102 to the clutch 104 and through the carrier 92 directly to the output shaft 12.

Figure 10:
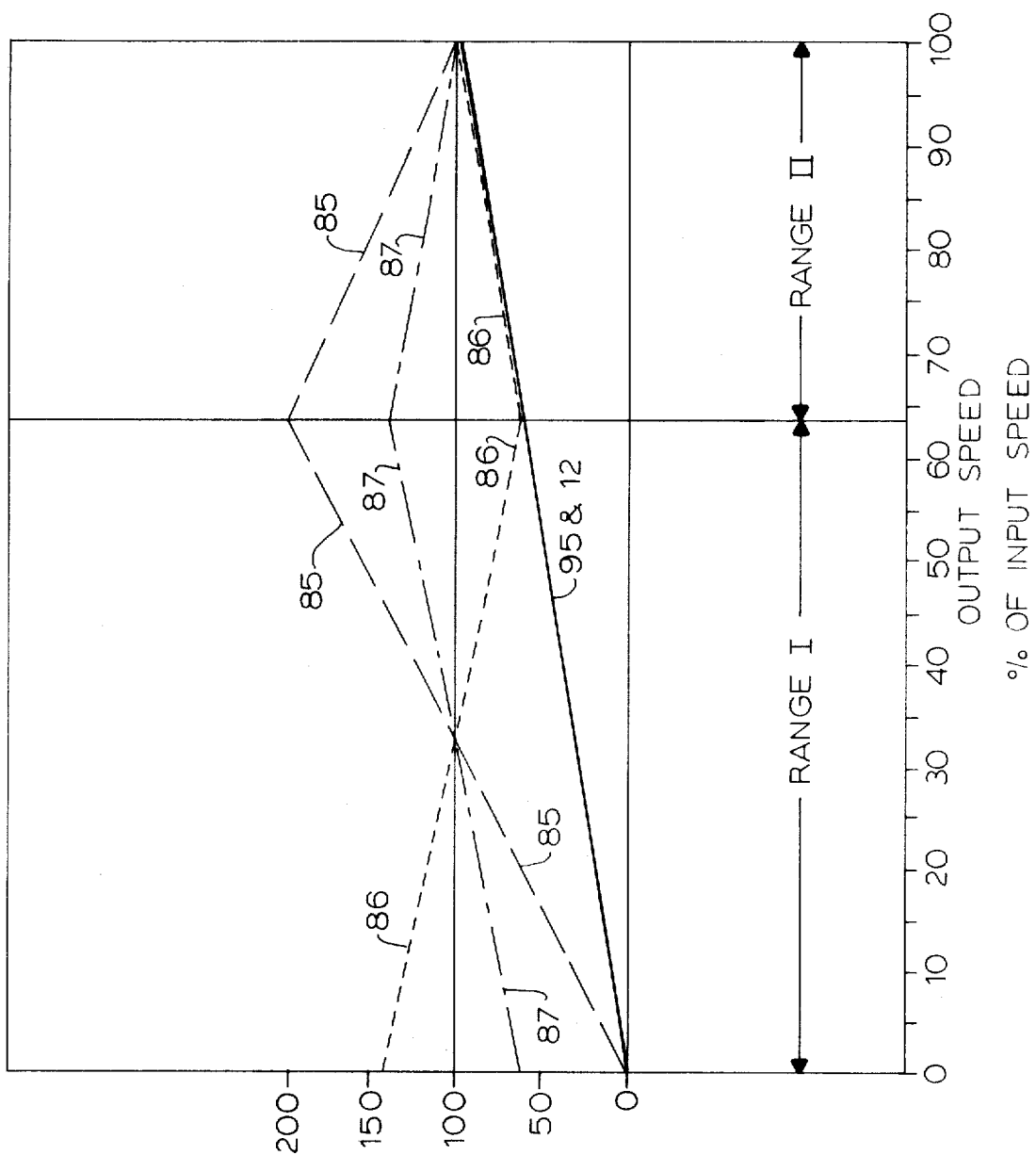
FIG. 10 is a speed lines diagram for the transmission of FIG. 9.

The speed lines diagram shown in FIG. 10 makes clear what is happening in this device and where the shifts take place.

In this instance, the device is run down to zero speed by causing the hydraulic units 100 and 107 to run faster than in the rest of the range, and reverse is accomplished by making them run even faster.

Figure 11:
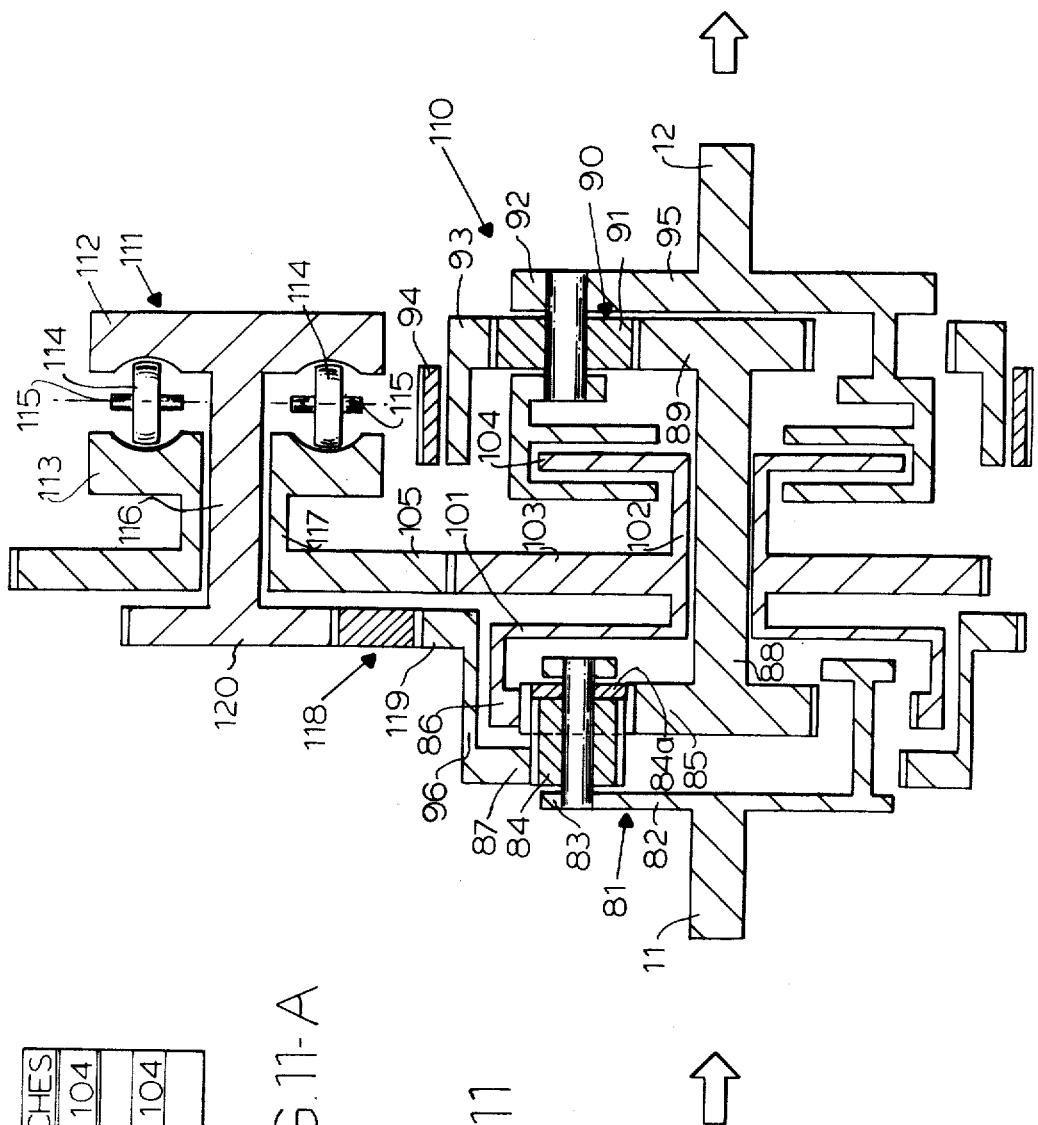
FIG. 11 is a view similar to FIG. 9 of another modified form of the invention in which the hydraulic units employed in FIG. 9 are replaced by a friction drive unit; the device is otherwise the same as in FIG. 9 and the clutch diagram of FIG. 9A would apply here, also.

A Two-Speed Transmission 110 Having a Friction-Variable Unit in Place of Hydraulic Unit (FIGS. 11 and 11A):

The transmission 110 of FIG. 11 is nearly identical to the transmission 80 of FIG. 9, with the exception that the hydraulic units 100 and 107 are replaced by a friction unit 111, comprising friction discs 112 and 113 and a series of rollers 114 between the discs. The adjustment of the angularity of the axes 115 of the rollers 114 causes the variations in speed, by changing the speeds of the discs 112 and 113 relative to each other, because (except in the position shown) the rollers 114 (usually three) contact the disc 113 at a different radius from that where they contact the disc 112. The disc 112 is mounted on a shaft 116 while the disc 113 is mounted on the shaft 117. As is well known, the rollers 114 are adjustably mounted in a stationary housing (not shown). Since the discs 112 and 113 rotate in opposite directions, an idler gear 118 is interposed between gears 119 and 120 which do not engage each other directly. The gear 119 is supported by the member 96 and is driven by the reaction ring gear 87.

Operation is quite similar to that of the transmission 80 of FIG. 9, except that neither disc 112 nor 113 can be stationary during operation; therefore, the relative proportions of the gears 86 and 87 will be different. The speed lines diagram would be therefore somewhat different from that shown in FIG. 10.

Figure 12:
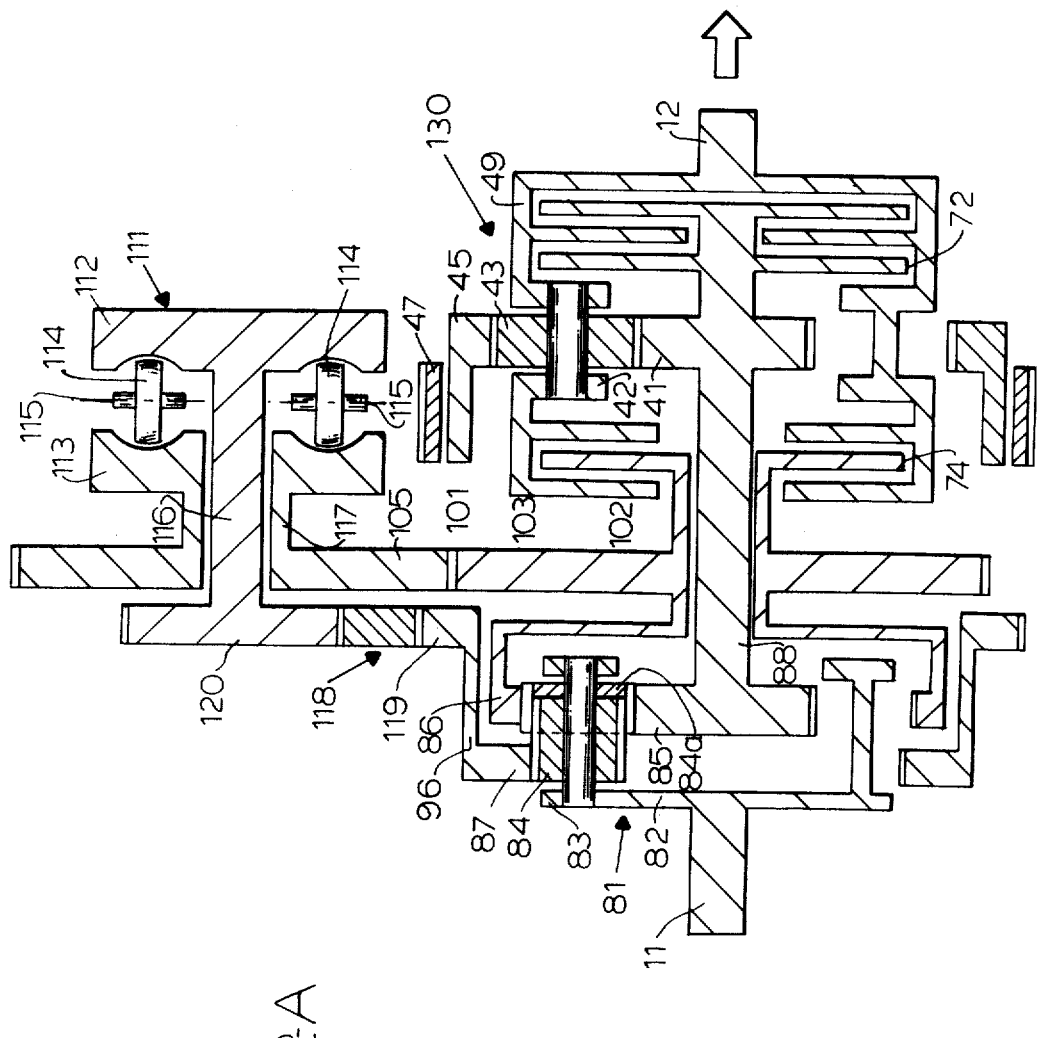
FIG. 12 is a view similar to FIG. 11 of another modified form of the invention, in this instance having three ranges instead of two as in FIG. 11.

A Three-Range Transmission 130 With a Friction-Variable Unit (FIGS. 12 and 12A):

The transmission 130 of FIG. 12 is a device substantially identical to the transmission 110 shown in FIG. 11 except for the use of the three-speed range, which is like that shown in FIG. 8 insofar as the second planetary assembly and the clutches there are concerned. (However, the gear 41 is here mounted on the shaft 88.) The main difference from that transmission 70 of FIG. 8 is the use of the friction-variable unit 111 and the use of the output and reaction gearing shown in FIGS. 9 and 11. Therefore, identical members are used wherever the units are identical. The operation achieved is very similar to what is obtained in FIG. 8 except that the zero speed is obtained by the relationships of the members of the planetary assembly 81.

Figure 13:
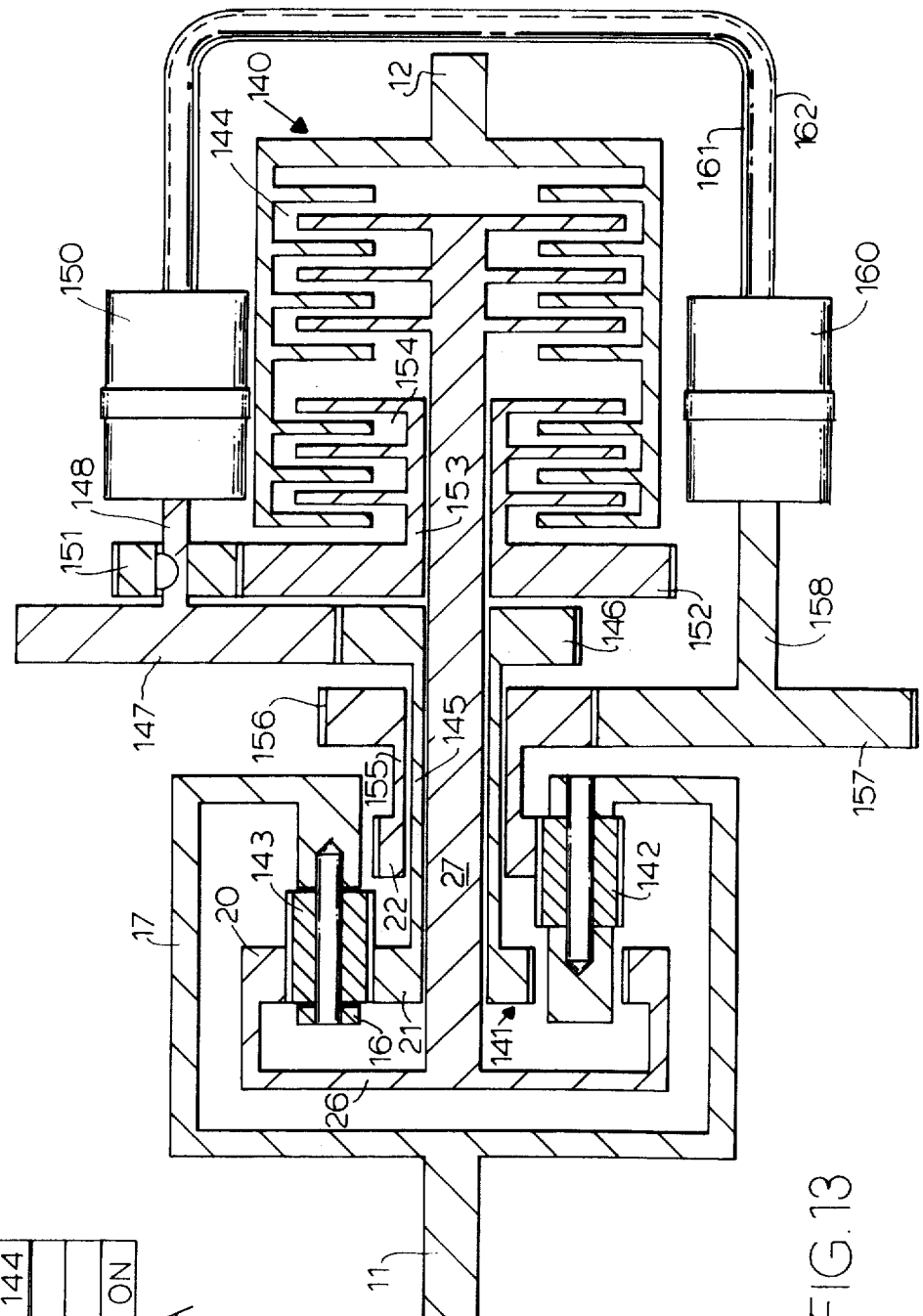
FIG. 13 is a schematic view in section of another modified form of transmission embodying the principles of the invention, showing a two-range transmission particularly suited for use in passenger cars. Fewer clutches are employed, but larger hydraulic units per power obtained are required.
Figure 14:
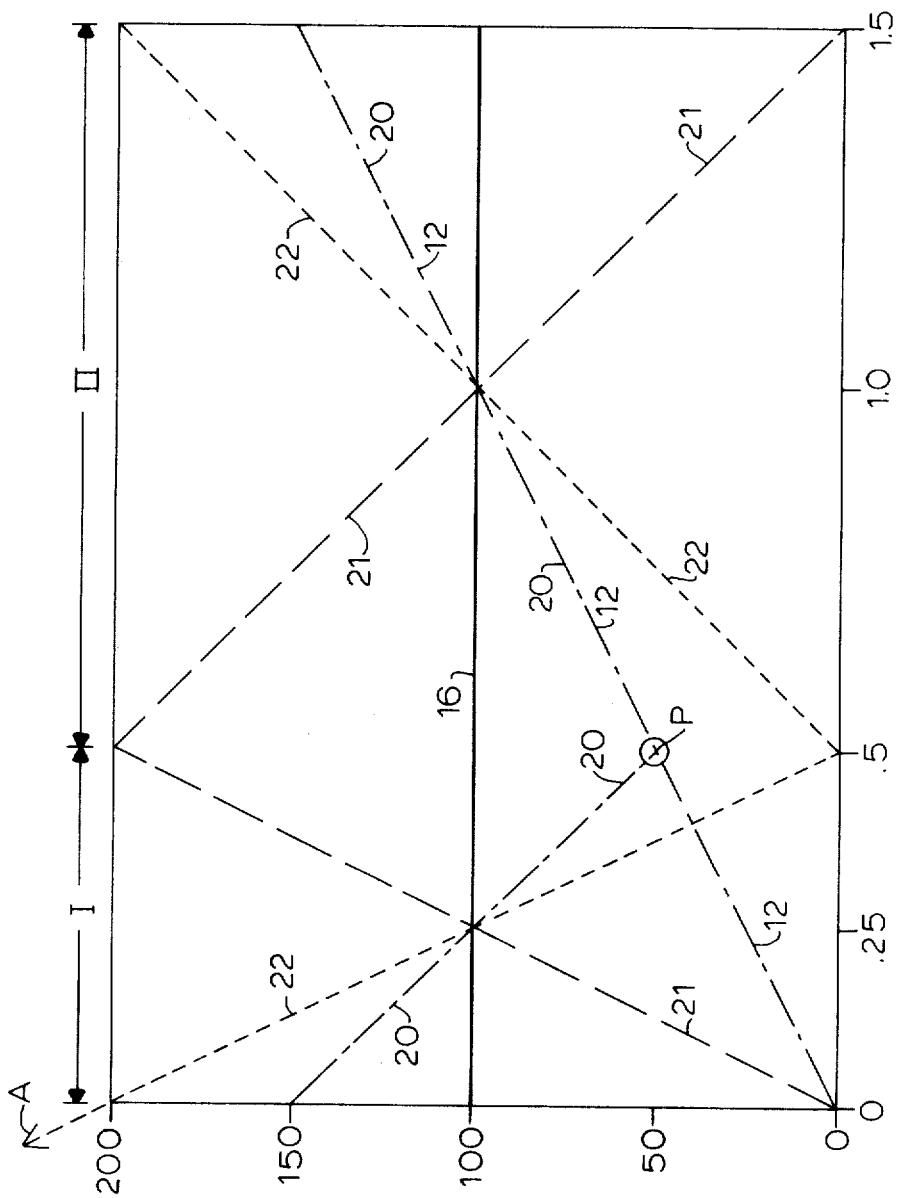
FIG. 14 is a speed lines diagram for the transmission of FIG. 13, the speeds of the planetary members as percent of rated input speed being plotted against output speed rate from 0.0 to 1.5 times input speed.
Figure 15:
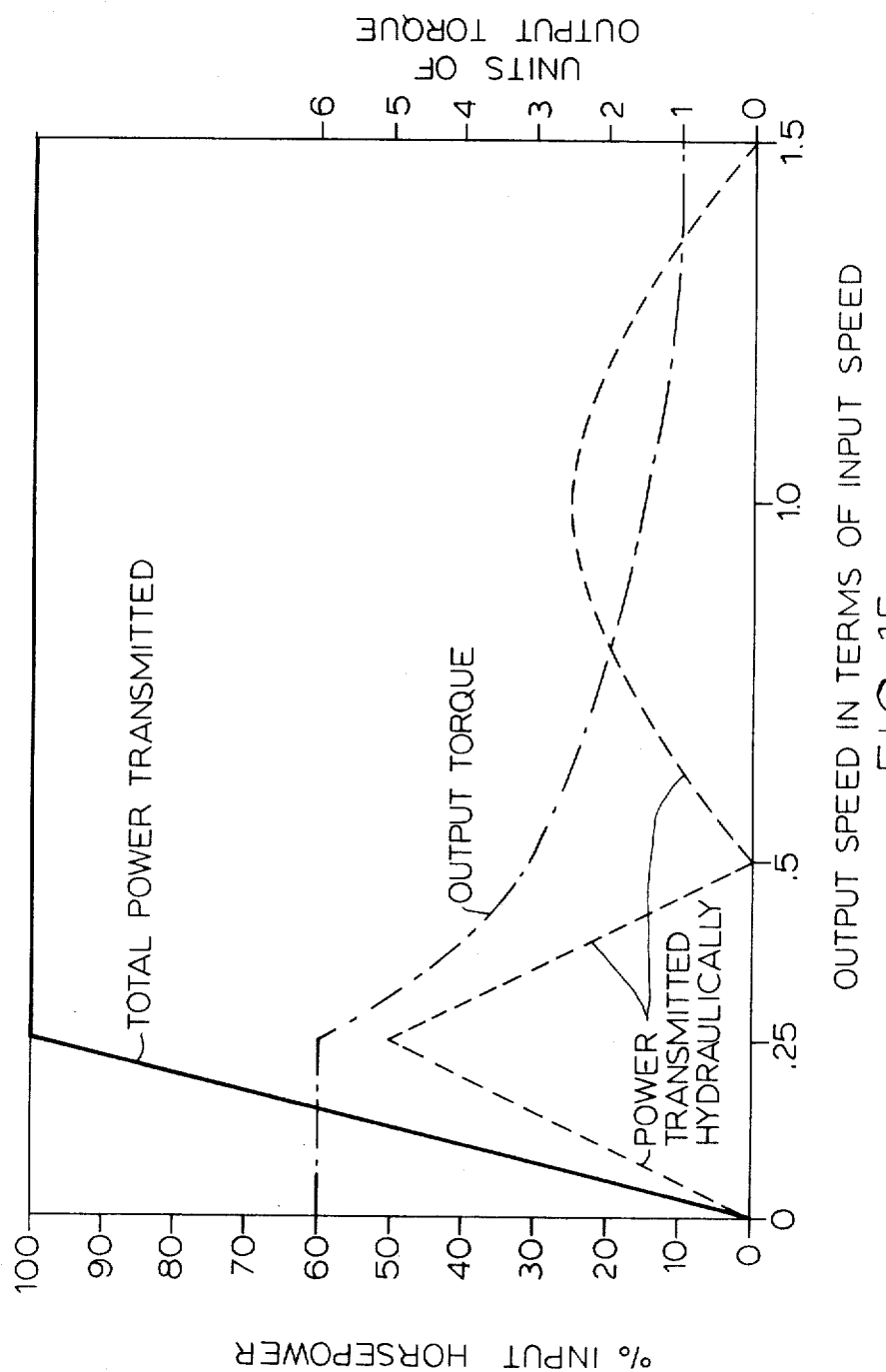
FIG. 15 is a torque and power diagram plotting output torque against output speed and also the total power transmitted and the percent power transmitted hydraulically against output speeds, rated as in FIG. 14.

A Passenger-Car Transmission (FIGS. 13-15):

The transmission described heretofore tend to be too large and too expensive for use in passenger cars. FIGS. 13-15 show a transmission 140 which in some respects is more simple than the transmissions heretofore described. There are only two clutches and the compound output planetary assembly 40 of FIG. 1 is eliminated, with certain gears being used in place thereof. The hydraulic units here have to be larger per units of input horsepower. Since a passenger car transmission rarely transmits in excess of 150 horsepower, this is feasible; however, for trucks the present transmission is less practical than those previously described, for truck transmissions may transmit 500 horsepower or even more, and the size of the hydraulic units required would become excessive if the transmission of FIG. 13 were to be used for trucks.

The input shaft 11 leads by the connection 17 to the carrier 16 of a planetary assembly 141 having two intermeshing sets of planet gears 142 and 143. The planet gears 142 are meshed with the sun gear 22, which serves as the reaction gear for the assembly 141. The ring gear 20 and the sun gear 21 are the two outputs, as in FIGS. 1-4, and they are both meshed with the planet gears 143.

The output ring gear 20 is connected by the radially extending member 26 to the shaft 27, which is directly clutchable to the output shaft 12 by a clutch 144.

The output sun gear 21 is secured to a hollow shaft 145 carrying a gear 146. The gear 146 is meshed with a gear 147 that is secured to a shaft 148 in driving relation with a hydraulic unit 150. The shaft 148 also is keyed to a gear 151, which meshes with a gear 152 on a hollow shaft 153. The shaft 153 is clutchable to the output shaft 12 by a clutch 154.

The reaction ring gear 22 is connected by a hollow shaft 155 to a gear 156 that meshes with a gear 157. The gear 157 is mounted on a shaft 158 in driving relation with a hydraulic unit 160. The hydraulic units 150 and 160 are hydraulically connected together by conduits 161 and 162, just as in all the other embodiments described and, in general, have the same functions. Both hydraulic units 150 and 160 are variable in stroke, as well as in speed, and are so connected that when one unit is at maximum stroke and other unit is at zero stroke, and vice versa. In forward drive, neither unit 150, 160 goes over center; in reverse drive, the unit 150 remains at full stroke, and the unit 160 goes over center.

Although this is a two-range transmission, an unexpectedly large amount of power is transmitted mechanically. This is shown in FIG. 15, which will be discussed after first discussing the speed lines diagram, FIG. 14. This diagram, FIG. 14, is labeled with reference numerals corresponding to those of the transmission 140 of FIG. 13. Thus, the speed of the carrier 16 is constant at 100 percent of the input speed. The output speed is labeled 12, as the speed of the output shaft 12. The speeds of the gears 20, 21 and 22 are labeled accordingly. The two speed ranges are labeled I and II.

Speed Range I extends from 0 to 0.5 on the output speed scale (output speed being expressed here in terms of the input speed). During this Range I, the output sun gear 21 is driving the output 12 through the gears 146, 147, 151 and 152 and the clutch 154. At the point P, the speed of the output ring gear 20 reaches the output speed, and therefore a synchronous shift can be made by engaging the clutch 144 and then disengaging the clutch 154; from then on, the output ring gear 20 drives the output shaft 12 by direct clutching, so that the gear 20 and the output shaft 12 rotate at the same speed. Range II extends from 0.5 to 1.5 on the speed scale.

Since the transmission 140 is intended for passenger cars, the reduction ratio does not need to be very high; in a truck it typically needs to be about 14 or 15 to 1 or more, but in a passenger car about 6 to 1 is entirely satisfactory, including the overdrive. As shown in FIG. 15, the amount of power transmitted hydraulically rises from 0 at speed 0 to 50 percent at output speed 0.25, drops to zero again at output speed 0.5, and then rises to 25 percent at output speed 1, subsequently reaching zero again at output speed 1.5. The reason why the percentage of horsepower has a different characteristic in between 0.0 and 0.5, i.e., in Range I, than between 0.5 and 1.5, in Range II, is that in Range I the hydraulic unit 150 is connected to the output gear 21 (via the gears 146 and 147) and to the output shaft 12 (via the gears 151 and 152 and the clutch 153), while the other hydraulic unit 160 is connected to the reaction gear 22 (via the gears 156 and 157). However, in Range II there is what may be called a double split, namely, both hydraulic units 150 and 160 are connected to reaction; they then transmit the power between the gears 21 and 22, but that power is only 50 percent of the power transmitted, for the other 50 percent is transmitted by the reaction between the planets 142 and 143. For that reason, Range II is very favorable, and the transmission 140 operates efficiently, due to the low percentage of power transmitted hydraulically.

Furthermore, the point P of shift, which occurs at 0.5 output speed, represents zero power transmitted hydraulically, as shown in FIG. 15. Consequently, there is a minimum interruption of torque in making that shift, because when zero power is transmitted hydraulically, the loss inherent in the hydraulic system is at a minimum.

In order to explain starting, consider the torque characteristics. The output torque curve in FIG. 15 has a 6:1 ratio during the constant horsepower range, which extends from 0.25 output speed to 1.5 output speed. Below 0.25 output speed toward zero, the torque represents a limit of what the wheels can absorb; therefore, no more torque needs to be supplied to the wheels. For that reason, the output torque is there shown as a straight line of constant value; since the speed is increasing, the horsepower is therefore decreasing, as shown, both for the hydraulic horsepower and for the overall input horsepower.

In order to accomplish the desired speed variations, the hydraulic units 150 and 160 behave in the following manner: At output speed zero, the unit 150 connected with the gear 21 is at maximum displacement, and the unit 160 connected with the gear 22 is at zero displacement. Going toward output speed 0.25, the unit 150 remains at full displacement, and the unit 160 decreases in displacement until it reaches full displacement. Going from output speed 0.25 to output speed 0.5, the hydraulic unit 150 decreases from full displacement to zero, and the hydraulic unit 160 remains at full displacement until it reaches zero speed. Consequently, at the point P of shift, the unit 160 is at full displacement, and the unit 150 is at zero displacement. The cycle is now repeated, and the unit 160 remains at full displacement until output speed 1.0 is reached, whereas the unit 150 increases from zero to full displacement at 1.0. Subsequently, going in the direction of speed 1.5, the hydraulic unit 160 decreases from full displacement to zero, whereas the hydraulic unit 150 remains constant until output speed 1.5 is reached. It is possible to vary these units 150 and 160 linearly, so that they go from full displacement to zero continually, and it is probably simpler to do so, but it will result in a slightly higher pressure situation, and it may or may not be desirable from the efficiency and constructional standpoint.

Reverse is accomplished by allowing the unit 150 to remain at full displacement and putting the unit 160 over center, which causes it to overspeed, as shown by arrow A, at the upper lefthand corner of FIG. 14. However, since it is undesirable to overspeed hydraulic units, this can be avoided by limiting the engine speed in reverse, because it is hardly ever necessary to run a car at full speed backwards.

Figure 16:
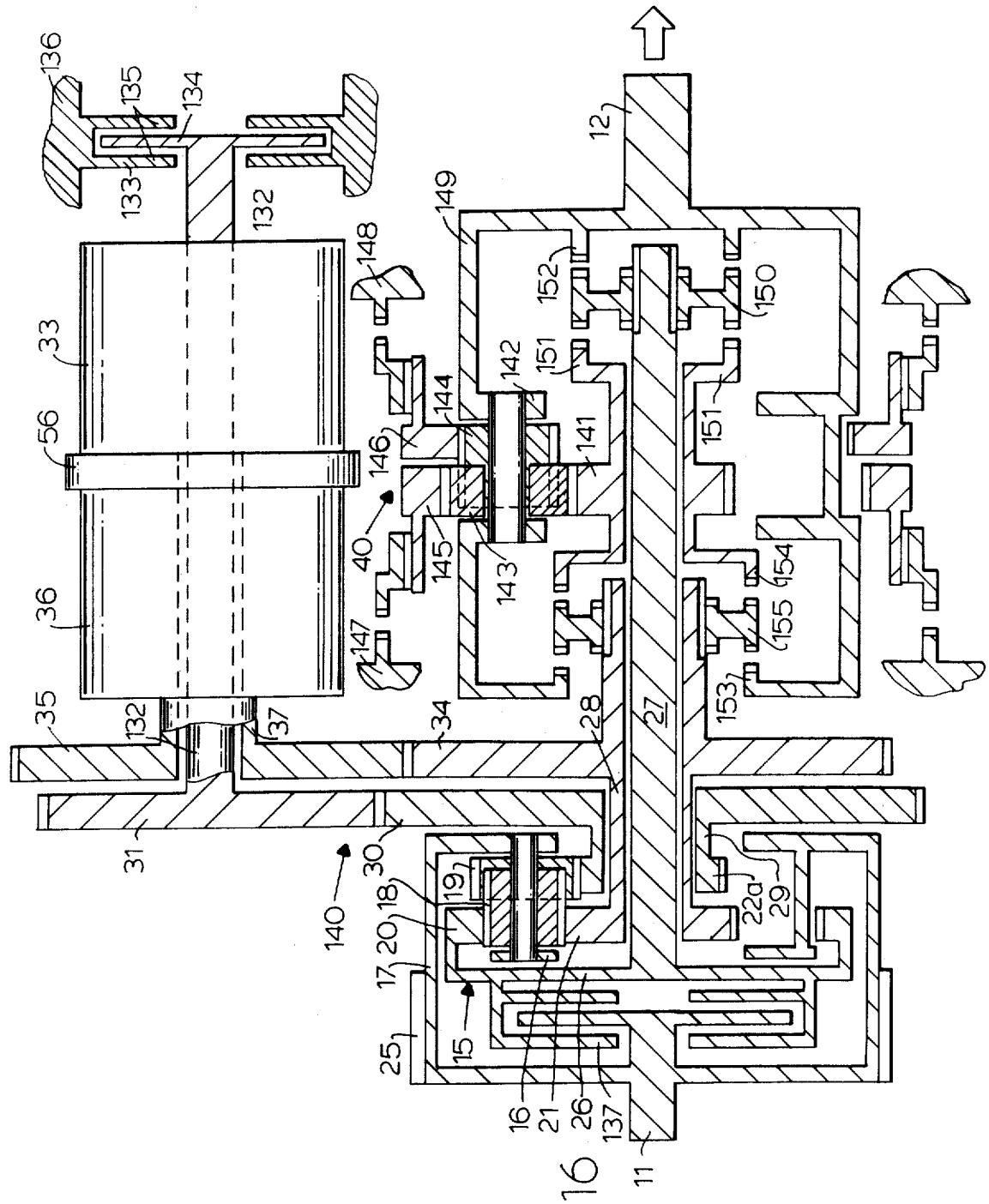
FIG. 16 is a schematic view in section of another modified form of transmission embodying the invention. It is generally like FIG. 2 with the addition of a brake for locking the shaft of one of the hydraulic units to the frame or housing, a clutch for locking together the input member and one output member (the one including the output ring gear) of the main planetary gear asembly, and a substitution of dog clutches for friction clutches in the output trains.

A Four-Stage Transmission Providing High Efficiency Direct Drive at Certain Points (FIGS. 16–20):

FIG. 16 shows a transmission 140 which is, in many ways, like the transmission 10 of FIG. 2. Identical reference numerals have been used for the parts that are substantially identical, and there is no need to describe those parts again. The description will therefore be limited to the parts that are different, many of which are simply numbers 100 higher than their corresponding parts of FIG. 2.

Thus, the hydraulic unit 33 is mounted on a shaft 132 which projects beyond the unit 33 to a brake 133. The brake 133 may be a friction brake and has a plate (or plates) 134 secured to the shaft 132 and plates 135 that are anchored to the frame or housing 136 for the transmission 140. By this means, the shaft 132, unit 33, and gears 31, 30 and 22 can be locked against rotation.

In the planetary assembly 15 everything remains the same except that a clutch 137 is interposed between the input shaft and the output ring gear 20 of the planetary assembly 15, so that the input and one output of the planetary assembly are locked together.

In the reduction gear portion of the transmission, dog clutches are shown instead of friction clutches, though friction clutches could be used. The advantages of the dog clutches are explained below. Thus, a dog clutch 150 is splined to the shaft 27 to slide thereon between a dog clutch 151 secured to the sun gear 41 and a dog clutch 152 secured to the connection 49 of the final output shaft 12. Similarly, a dog clutch 153 is secured to the connection 49 (which is itself attached to the carrier 42), and a dog clutch 154 is secured to the sun gear 41, while a dog clutch 155 is splined to the shaft 28 in sliding relation thereto.

No special speed lines diagram need be provided, for reference to FIG. 5 can supply the information, particularly when the line 22a is used rather than the line 22.

The described transmission 140 accomplishes several things. First, it produces high efficiency in direct drive at top ratio and also at some other points of the reduction range. Second, this direct drive makes it possible to substitute the dog clutches 150 through 156 for the friction clutches 50, 53, 54, and 55 in the reduction gearing. While it is possible to use dog clutches in the FIG. 2 system, shifting them under synchronous conditions with an elaborate control, the FIG. 16 structure provides for simple shifting under conditions of perfect synchronism, while at the same time producing higher efficiency at certain points of the reduction range and, in particular, at the maximum output speed.

With reference to FIG. 5, note that the reaction gear 22a reaches zero speed at the maximum output speed of 65 miles an hour, at the end of range IV. The gear 22a also reaches zero speed at the changeover point from range II to range III, at about 16 miles per hour, and the gear 22a again reaches zero speed at approximately 4 miles an hour within range I. The gear 22a is held at zero speed at those times because the hydraulic unit 33 associated with it is on stroke, whereas the hydraulic unit 36 associated with the gear 21 is at that point on zero stroke. Therefore, in the FIG. 2 transmission using the gear 22a, as well as in FIG. 16, the hydraulic unit 33 connected with 22a is locked from rotation, due to the fact that it cannot circulate oil into the hydraulic unit 36. The weakness of a hydraulic lock lies in the fact that, although zero horsepower is transmitted hydraulically at that point in theory, in actuality there is leakoff, as considerable pressure is exerted, and there are losses due to the rotation which result in compressibility losses. Hence, even with zero power transmitted hydraulically, there is nevertheless a fair amount of loss in the FIG. 2 transmission, and this loss could be about three or four percent. However, by mechanically locking the gear 22a to the case 136 so as to make it stationary, —this being done in FIG. 16 by the brake —then the hydraulic unit 33 is under no load; it merely spins, and the pressure in it is equal only to the charge pressure, so that the losses are negligible. Consequently, the transmission 140 of FIG. 16 arrangement results at the three points mentioned, in higher efficiency from the standpoint of fuel consumption on the highway, because the truck operates there in direct drive. Since most trucks operate at top ratio most of the time, especially on interstate highways, this feature is important from the standpoint of saving fuel.

Another important feature is a corollary of this locking arrangement. When the gear 22a is held stationary, there is absolute synchronism of those parts which need to be engaged and disengaged at the point of changeover from range II to range III. Therefore, it is possible to use the dog clutches 150, 151, 152, 153, and 154 without any elaborate electronic controls, for the shift is absolutely synchronous. In addition, if the planetary assembly 15 is locked at the equal speed point, which occurs at changeover from range III to range IV and from range I to range II, then there is also absolute synchronism between the members which need to be engaged and disengaged, and therefore dog clutches are also feasible at those shifts. This is also true of the reaction clutches for the final output planetary assembly 40 as well as for the reverse clutch 48 of the same planetary assembly 40.

However, dog clutches cannot so conveniently be used at the brake 133 nor at the brake 137. The clutch 133 grounds the hydraulic unit 33 to the housing 136, and the clutch 137 connects the two members 16 and 20 of the input planetary assembly 15, to lock together the input and the first output.

The first type of lockup, where the brake 133 is engaged, occurs where the gear 22a reaches zero speed, and the second type of lockup, where the clutch 137 is engaged occurs at the equal speed points. These clutches 136 and 137 should preferably be of the friction type, to enable them to stop the pertinent members from rotating in spite of leakoff or other losses in the hydraulic unit. It is, of course, possible to have dog clutches here too, if an elaborate system for engaging them and determining their synchronism is used, but this becomes expensive.

At the point where the shift is made from range I to range II and at the point where the shift is made from range III to range IV, all the speed lines converge at one point, which means that the planetary members all reach the same speed. Therefore, it is entirely possible at those points to lock any two planetary members together, and then the power will be transmitted entirely mechanically and the hydraulic system will not be under pressure. It is, for instance, possible to use the clutch 137, which will lock the input to the first output. As an alternative, it is also possible to use instead a clutch 160 (FIG. 17) which locks the input to the second output, the sun gear 21. Another possibility is to use a clutch 161 (FIG. 18) to lock the second output, the sun gear 21, to the first output, the ring gear 20 or its extension 26. For the sake of illustration, FIG. 19 shows that it is also possible for the input to be locked to the reaction gear 22a by a clutch 162, and FIG. 20 shows that the reaction shaft 29 may be locked to the second output shaft 28 by a clutch 163. It is, of course, unnecessary, and even impractical, to use all of the clutches 137, 160, 161, 162, and 163 in a single transmission. Only one of them is needed. From the standpoint of simplicity of construction and oil feed, the clutch 137 is probably the simplest to install.

In the case of brake 133, which, in effect, connects the reaction gear 22a to the case 136, the best location is the one shown.

As said before, the speed lines remain exactly as shown in FIG. 5 excepting that they are those as shown by the line 22a rather than the line 22. If the gear 22 is used, then it is still possible to also have a lockup at top ratio, but it will not synchronize the shift from range II to range III, as can be seen, for the line 22 crosses the zero speed line before and after the shift point, while with the gear 22a, the lockup occurs exactly at the shift point, which is where it should be for bringing about synchronous shifting. As far as the lockups at equal speed points are concerned, they remain exactly as is shown in FIG. 5 with both gears 22 and 22a and no alternative is required.

As previously noted, the locking together of the two members of the planetary assembly 15 at the equal speed point has the desirable function of transmitting all the power at that point mechanically, and this eliminates the losses in the hydraulic system at those times. The same thing occurs when the reaction gear 22a is locked to the case 136. Consequently, this construction gives the highest efficiency at the points where there is locking of either the brake 133 or the clutch 137 and enables the economical use of the dog clutches 150 through 155, which are much simpler and cheaper in the construction than friction clutches.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A power transmission comprising:
    input means,
    output means,
    a planetary gear assembly having an input member connected to said input means, two output members, and a reaction member,
    means for successively connecting each said output member to said output means to drive said output means through a preselected speed range,
    means for disconnecting each said output member from the output means after the other output member has been connected thereto, and
    speed-varying means at all times in driving engagement with said reaction member and at all times in driving engagement with the same said output member and only that said output member.

2. The transmission of claim 1 wherein said speed-varying means comprises:
    a first hydraulic unit in driving engagement with said reaction member, and
    a second hydraulic unit of variable displacement in driving engagement with said one output member only and hydraulically connected to said first hydraulic unit, one said hydraulic unit serving as a pump while the other one serves as a motor, and vice versa.

3. The transmission of claim 2 wherein said first hydraulic unit has a variable displacement.

4. A power transmission comprising:
    input means,
    output means,
    a planetary gear assembly having an input member connected to said input means, two output members, and a reaction member,
    means for successively connecting each said output member to said output means to drive said output means through a preselected speed range,
    means for disconnecting each said output member from the output means after the other output member has been connected thereto, and
    speed-varying means in driving engagement with said reaction member and with one said output member, said speed-varying means comprising:
    a first hydraulic unit in driving engagement with said reaction member and having a variable displacement, and
    a second hydraulic unit of variable displacement in driving engagement with one said output member and hydraulically connected to said first hydraulic unit, one said hydraulic unit serving as a pump while the other one serves as a motor, and vice versa,
    said means for connecting and disconnecting comprising:
    first clutch means for releasably connecting one said output member directly to said output means, a first gear train connecting the other said output member to said second hydraulic member, an auxiliary shaft, a second gear train connecting said second hydraulic unit to said auxiliary shaft, and second clutch means for releasably connecting said auxiliary shaft to said output shaft.

5. The transmission of claim 4 wherein said auxiliary shaft is hollow and is coaxial with said input and output shafts.

6. The transmission of claim 4 wherein said planetary assembly has as its input member a carrier having two sets of intermeshed planet gears, said output members being a ring gear and a sun gear meshed with the same set of planet gears, and the reaction member being a sun gear meshed with the other set of planet gears.

7. The transmission of claim 6 wherein said ring gear is directly connected to said first clutch means, the output sun gear being connected to said second clutch means through said first and second gear trains.

8. The transmission of claim 4 wherein at the point of shift between said first and second clutch means, said first hydraulic unit is on maximum stroke and said second hydraulic unit is on zero stroke.

9. The transmission of claim 2 wherein said first hydraulic unit has a fixed stroke.

10. The transmission of claim 1 wherein said speed-varying means is a frictional-drive unit having two friction discs with spherical segments and a set of rollers having axes rotatable to contact the discs at different radii.

11. The transmission of claim 10 wherein said reaction member is connected to one said friction disc through a gear train including an idler direction-reversing gear.

12. The transmission of claim 1 wherein said input means, said output means, said output member, and said reaction member are all coaxial.

13. The transmission of claim 1 wherein said means for successively connecting and said means for disconnecting, comprise:

first clutch means for releasably connecting each said output member directly to said output means, a reduction gear train connected to said output means, and second clutch means for releasably connecting at least one said output member to said reduction gear train.

14. The transmission of claim 13 wherein said reduction gear means includes a second planetary gear assembly having a planet carrier connected to said output means, a set of planet gears carried by said planet carrier, a sun gear connected to said second clutch means and meshed with said set of planet gears, and a ring gear meshed with said set of planet gears, and brake means for releasably rendering said ring gear stationary.

15. The transmission of claim 14 wherein said second clutch means is able to connect both said output members to said reduction gear means.

16. The transmission of claim 14 wherein said second planetary gear assembly also includes a second set of planet gears carried by said carrier and meshed with said first set of planet gears, a second ring gear meshed with said second set of planet gears, and second brake means for releasably rendering said second ring gear stationary, whereby said output means can be driven in reverse without changing the direction of drive of said input means.

17. The transmission of claim 16 wherein said second clutch means is able to connect both said output members to said reduction gear train.

18. The transmission of claim 1 wherein said planetary gear assembly has two sets of planet gears carried by a single carrier and intermeshed with each other, a first said set being meshed with both said output members, the other said set being meshed with a gear of said assembly which constitutes said reaction member.

19. The transmission of claim 18 wherein said input member is said carrier and said output members are a sun gear and a ring gear.

20. The transmission of claim 19 wherein said reaction member is a sun gear.

21. The transmission of claim 19 wherein said reaction member is a ring gear.

22. The transmission of claim 1 wherein said planetary gear assembly has two sets of planet gears carried by a single carrier, said carrier being one said output member, the other said output member being a sun gear meshed to a first said set of planet gears, the reaction member being a gear meshed to a second said set of planet gears, the input member being a ring gear meshed to said second set of planet gears.

23. A power transmission comprising:

input means, output means, a planetary gear assembly having an input member connected to said input means, first and second output members, and a reaction member, means for successively connecting each said output member to said output means to drive said output means through a preselected speed range, means for disconnecting each said output member from the output means after the other output member has been connected thereto, a first hydraulic unit in driving engagement with said reaction member, and a second hydraulic unit of variable displacement in driving engagement at all times with said first output member and hydraulically connected to said first hydraulic unit, one said hydraulic unit serving as a pump while the other one serves as a motor, and vice versa, said input means, said output means, said output members, and said reaction member all being coaxial.

24. The transmission of claim 23 wherein said means for successively connecting and said means for disconnecting, comprise:

first clutch means for releasably connecting each said output member directly to said output means, a reduction gear train connected to said output means, and second clutch means for releasably connecting at least one said output member to said reduction gear train.

25. The transmission of claim 24 wherein said reduction gear means includes a second planetary gear assembly having a planet carrier connected to said output means, a set of planet gears carried by said planet carrier, a sun gear connected to said second clutch means and meshed with said set of planet gears, and a ring gear meshed with said set of planet gears, and brake means for releasably rendering said ring gear stationary.

26. The transmission of claim 25 wherein said second clutch means is able to connect both said output members to said reduction gear means.

27. The transmission of claim 25 wherein said second planetary gear assembly also includes a second set of planet gears carried by said carrier and meshed with said first set of planet gears, a second ring gear meshed with said second set of planet gears, and second brake means for releasably rendering said second ring gear stationary, whereby said output means can be driven in reverse without changing the direction of drive of said input means.

28. The transmission of claim 25 wherein said second clutch means is able to connect both said output members to said reduction gear train.

29. The transmission of claim 23 wherein said first hydraulic unit has a variable displacement.

30. The transmission of claim 23 wherein said first hydraulic unit has a fixed displacement.

31. A power transmission comprising:
input means,
output means,
a planetary gear assembly having an input member connected to said input means, two output members, and a reaction member,
means for successively connecting each said output member to said output means to drive said output means through a preselected speed range,
means for disconnecting each said output member from the output means after the other output member has been connected thereto,
a first hydraulic unit in driving engagement with said reaction member, and
a second hydraulic unit of variable displacement in driving engagement with one said output member and hydraulically connected to said first hydraulic unit, one said hydraulic unit serving as a pump while the other one serves as a motor, and vice versa,
said input means, said output means, said output members, and said reaction member all being coaxial,
said means for connecting and said means for disconnecting comprising:
first clutch means for releasably connecting one said output member directly to said output means;
a first gear train drivingly connecting the other said output member to said second hydraulic unit,
a hollow auxiliary shaft coaxial with said input and output means,
a second gear train drivingly connecting said second hydraulic unit to said hollow auxiliary shaft, and
second clutch means for releasably connecting said hollow auxiliary shaft to said output means,
both said hydraulic units being of variable displacement.

32. The power transmission of claim 31 wherein said planetary assembly comprises a carrier as said input member having first and second sets of intermeshed planet gears, a ring gear serving as one said output member and a sun gear serving as the other output member, both said ring and sun gears being meshed with said first set of planet gears, and a sun gear serving as said reaction gear and meshed with said second set of planet gears, a first central shaft coaxial with said planetary assembly and secured rigidly to said ring gear,
a second hollow shaft coaxial with said first central shaft and secured rigidly to said output sun gear,
one gear of said first gear train being rigidly secured to said second hollow shaft,
said first gear train having a second gear rigidly secured to a shaft in driving relation with said second hydraulic unit, that said shaft also having rigidly secured thereto a first gear of said second gear train, a second gear of said second gear train being rigidly secured to said first hollow shaft,
a third hollow shaft coaxial with said second hollow shaft and rigidly secured to said reaction sun gear and having a further gear rigidly secured thereto, and
an additional gear meshed with said further gear and mounted on a shaft in driving relation with said first hydraulic unit.

33. A power transmission comprising:
input means,
output means,
a planetary gear assembly having an input member connected to said input means, a first planet gear set intermeshed with a second planet gear set and carried by a single carrier, both said sets being connected in driving relation to said input member, first and second output members connected to said first set, and a reaction member connected to said second set,
means for successively connecting each said output member to said output means to drive said output means through a preselected speed range,
means for disconnecting each said output member from the output means after the other output member has been connected thereto, and
speed-varying means at all times in driving engagement with said reaction member and with said first output member.

34. The transmission of claim 33 wherein said input member is a planet carrier carrying both said sets of planet gears, said output members being a ring gear and a sun gear, each meshed with said first set of planet gears, said reaction member being a sun gear meshed with the second set of planet gears.

35. The transmission of claim 33 wherein said input member is a ring gear meshed with the second set of planet gears, said reaction member being a sun gear meshed with said second set of planet gears, said output members being a sun gear meshed with said first set of planet gears and a planet carrier carrying both said sets of planet gears.

36. The transmission of claim 33 wherein said speed-varying means comprises:
a first hydraulic unit in driving engagement with said reaction member, and
a second hydraulic unit of variable displacement in driving engagement with said first output member and hydraulically connected to said first hydraulic unit, one said hydraulic unit serving as a pump while the other one serves as a motor, and vice versa.

37. The transmission of claim 36 wherein said first hydraulic unit has a variable displacement.

38. The transmission of claim 36 wherein said first hydraulic unit has a fixed stroke.

39. The transmission of claim 33 wherein said speed-varying means is a friction-drive unit having two friction discs with spherical segments and a set of rollers having axes rotatable to contacct the discs at different radii.

40. The transmission of claim 39 wherein said reaction member is connected to one said friction disc through a gear train including an idler direction-reversing gear.

41. A power transmission comprising:
input means,
output means,
a planetary gear assembly having an input member connected to said input means, first and second output members, and a reaction member,
a first hydraulic unit in driving engagement with said reaction member,
a second hydraulic unit in driving engagement at all times with said second output member and hydraulically connected to said first hydraulic unit, one said hydraulic unit serving as a pump while the other one serves as a motor, and vice versa,
a reduction gear train connected to said output means,
first clutch means for releasably connecting said second output member to said reduction gear train so as to drive said output means through a preselected forward speed range,
second clutch means for connecting said first output member directly to said output means to drive said output means through a different preselected forward speed range, said first clutch means disconnecting said second output member from said reduction gear train after said first output member has been connected to said output means, and
third clutch means for connectiong said second output member directly to said output means for driving said output means through another preselected forward speed range, said second clutch means disconnecting said first output member from said output means after said second output member has been connected thereto.

42. The transmission of claim 41 wherein said reduction gear train is provided with reverse means for reversing the direction of said output means with respect to said forward speed range and reverse engaging means for energizing said reverse means.

43. The transmission of claim 41 having fourth clutch means for releasably connecting said first output member to said reduction gear train for driving said output means through a preselected forward speed range slower than that at which it is driven by said second output member through said reduction gear train, said fourth clutch means disconnecting said reduction gear train from said first output member after said second output member has been connected to said output gear train.

44. The transmission of claim 43 wherein said reduction gear train is provided with reverse means and means for energizing said reverse means.

45. The transmission of claim 41 wherein said input means, output means, planetary gear assembly, and reduction gear train are all coaxial.

46. A power transmission comprising:
input means,
output means,
a planetary gear assembly having an input member connected to said input means, a first planet gear set intermeshed with a second planet gear set and carried by a single carrier, both said sets being connected in driving relation to said input member, first and second output members connected to said first set, and a reaction member connected to said second set,
a first hydraulic unit in driving engagement with said reaction member,
a second hydraulic unit of variable displacement in driving engagement at all times said second output member and hydraulically connected to said first hydraulic unit, one said hydraulic unit serving as a pump while the other one serves as a motor, and vice versa,
a reduction gear train connected to said output means,
a first clutch means for releasably connecting said second output member to said reduction gear train so as to drive said output means through a preselected forward speed range,
second clutch means for connecting said first output member directly to said output means to drive said output means through a different preselected forward speed range, said first clutch means disconnecting said second output member from said reduction gear train after said first output member has been connected to said output means, and
third clutch means for connecting said second output member directly to said output means for driving said output means through another preselected forward speed range, said second clutch means disconnecting said first output member from said output means after said second output member has been connected thereto.

47. The transmission of claim 46 wherein said reduction gear train is provided with reverse means for reversing the direction of said output means with respect to said forward speed range and reverse engaging means for energizing said reverse means.

48. The transmission of claim 46 having fourth clutch means for releasably connecting said first output member to said reduction gear train for driving said output means through a preselected forward speed range slower than that at which it is driven by said second output member through said reduction gear train, said fourth clutch means disconnecting said reduction gear train from said first output member after said second output member has been connected to said output gear train.

49. The transmission of claim 48 wherein said reduction gear train is provided with reverse means and means for energizing said reverse means.

50. The transmission of claim 46 wherein said input means, output means, planetary gear assembly, and reduction gear train are all coaxial.

51. The transmission of claim 46 wherein said input member is a planet carrier carrying both said sets of planet gears, said output members being a ring gear and a sun gear, each meshed with said first set of planet gears, said reaction member being a sun gear meshed with the second set of planet gears.

52. The transmission of claim 46 wherein said input member is a ring gear meshed with the second set of planet gears, said reaction member being a sun gear meshed with said second set of planet gears, said output members being a sun gear meshed with said first set of planet gears and a planet carrier carrying both said sets of planet gears.

53. The transmission of claim 46 wherein said first hydraulic unit is of variable displacement.

54. The transmission of claim 46 wherein said first hydraulic unit is of fixed displacement.

55. A power transmission comprising;
input means,
output means,
a planetary gear assembly having an input member connected to said input means, a first planet gear set intermeshed with a second planet gear set, both said sets being carried by a single carrier, and being connected in driving relation to said input member, first and second output members connected to said first set, and a reaction member connected to said second set,
a first hydraulic unit in driving engagement with said reaction member,
a second hydraulic unit of variable displacement in driving engagement with said second output member and hydraulically connected to said first hydraulic unit, one said hydraulic unit serving as a pump while the other one serves as a motor, and vice versa,
a reduction gear train having an output member connected to said output means and having an input member connected to said first output member, and having a reaction member,
releasable brake means for holding said reaction member of said reduction gear stationary,
first clutch means for connecting said second output member directly to said output means to drive said output means through a different preselected forward speed range, said brake means being disengaged to release its said reaction member after said second output member has been connected to said output means, and
second clutch means for connecting said first output member directly to said output means for driving said output means through another preselected forward speed range, said first clutch means disconnecting said second output member from said output means after said first output member has been connected thereto.

56. The transmission of claim 55 wherein said input means, output means, planetary gear assembly, and reduction gear train are all coaxial.

57. The transmission of claim 55 wherein said input member is a ring gear meshed with the second set of planet gears, said reaction member of said planetary gear assembly being a sun gear meshed with said second set of planet gears, said first output member being a sun gear meshed with said first set of planet gears, said second output member being a planet carrier both said sets of planet gears.

58. A power transmission comprising;
input means,
output means,
a planetary gear assembly having a planet carrier connected to said input means and carrying two sets of planetary gears, a first planet gear set intermeshed with a second planet gear set, two output members connected to said first set, one a sun gear and one a ring gear, and a reaction ring gear connected to said second set,
means for successively connecting each said output member to said output means to drive said output means through a prepselected speed range,
means for disconnecting each said output member from the output means after the other output member has been connected thereto,
a first hydraulic unit in driving engagement with said reaction member, and
a second hydraulic unit of variable displacement in driving engagement at all times with one only of said output members and hydraulically connected to said first hydraulic unit, one said hydraulic unit serving as a pump while the other one serves as a motor, and vice versa.

59. The transmission of claim 58 wherein said sun gear output member is connected to a shaft having a second sun gear thereon, said second sun gear being part of a second planetary assembly having a planet carrier connected to said output means and a ring gear, and releasable brake means for holding said ring gear of said second planetary assembly stationary.

60. A power transmission comprising:
input means,
output means,
a planetary gear assembly having as an input member a planet carrier connected to said input means, and carrying first and second sets of planet gears, said first planet gear set being intermeshed with said second planet gear set, two output members connected to said first set, one a sun gear and the other a ring gear, and a reaction ring gear connected to said second set,
means for successively connecting each said output member to said output means to drive said output means through a preselected speed range,
means for disconnecting each said output member from the output means after the other output member has been connected thereto, and
a friction drive unit having two friction discs with spherical segments and a set of rollers having axes rotatable to control the discs at different radii, one said unit being connected in driving engagement with said reaction ring gear, and the other said disc being connected in driving engagement with said ring gear output member.

61. The transmission of claim 60 wherein said reaction ring gear and said ring gear output member are both connected to their discs through respective gear trains, one of which includes an idler direction-reversing gear.

62. The transmission of claim 60 wherein said sun gear output member is connected to a shaft having thereon a sun gear of a second planetary assembly having a planetary carrier connected to said output means and a ring gear, and releasable brake means for holding stationary said ring gear of said second planetary assembly.

63. The transmission of claim 62 having clutch means for connecting each said output member directly to said output means.

64. A power transmission comprising
an input shaft,
an output shaft coaxial with said input shaft,
a planetary gear assembly coaxial with said input and output shafts and having a planet carrier connected to said input shaft and carrying two sets of planetary gears, a first planet gear set intermeshed with a second planet gear set, two output members connected to said first set, one a sun gear and one a ring gear, and a reaction sun gear connected to said second set,
a first hydraulic unit of variable displacement,
a second hydraulic unit of variable displacement hydraulically connected with said first hydraulic unit, one said hydraulic unit serving as a pump while the other one serves as a motor, each said hydraulic unit having a rotary shaft in driving engagement therewith,
a first pinion gear secured to the shaft for said first hydraulic unit,
second and third pinion gears secured to the shaft for said second hydraulic unit,
a first transmission shaft coaxial with said input and output shafts and between them, having said output ring gear secured thereto,
first clutch means for connecting said first transmission shaft to said output shaft and for disconnecting them,
a hollow second transmission shaft surrounding a portion of said first transmission shaft and coaxial therewith having said output sun gear secured thereto and having a fourth pinion gear secured thereto and in mesh with said second pinion gear,
a hollow third transmission shaft surrounding a portion of said second transmission shaft and coaxial therewith, having said reaction sun gear secured thereto and having secured thereto a fifth pinion gear in mesh with said first pinion gear,
a hollow fourth transmission shaft surrounding a portion of said first transmission shaft beyond said second transmission shaft and coaxial with said first transmission shaft and having secured thereto a sixth pinion gear in mesh with said third pinion gear, and
second clutch means for connecting said fourth transmission shaft to said output shaft and for disconnecting them.

65. A power transmission comprising:
input means,
output means,
a planetary gear assembly having an input member connected to said input means, two output members, and a reaction member,
means for successively connecting each said output member to said output means to drive said output means through a preselected speed range,
means for disconnecting each said output member from the output means after the other output member has been connected thereto, and
speed-varying means in driving engagement with said reaction member and with one said output member, said speedvarying means comprising:
a first hydraulic unit in driving engagement with said reaction member, and
a second hydraulic unit of variable displacement in driving engagement with one said output member and hydraulically connected to said first hydraulic unit, one said hydraulic unit serving as a pump while the other one serves as a motor, and vice versa,
said first hydraulic unit comprising:
a rotatable shaft in driving relation to said reaction member,
a rotary member secured to said rotatable shaft, and
releasable means for locking said rotatable shaft against rotation when said first hydraulic unit is at zero speed.

66. A power transmission comprising:
input means,
output means,
a planetary gear assembly having an input member connected to said input means, two output members, and a reaction member,
means for successively connecting each said output member to said output means to drive said output means through a preselected speed range,
means for disconnecting each said output member from the output means after the other output member has been connected thereto,
speed-varying means in driving engagement with said reaction member and with one said output member,
a case for said transmission, and
releasable means for locking said reaction member to said case at times when said reaction member is at approximately zero speed.

67. The transmission of claim 1 having clutch means for releasably connecting together two of said members of said planetary gear assembly.

68. The transmission of claim 1 having clutch means for releasably connecting together said input member and one said output member.

69. The transmission of claim 1 having clutch means for releasably connecting together said input member to said reaction member.

70. The transmission of claim 1 wherein clutch means for releasably connecting said reaction member to one said output member.

71. The transmission of claim 1 having clutch means for releasably connecting said output members to each other.

72. A power transmission comprising:
input means,
output means,
a planetary gear assembly having an input member connected to said input means, two output members, and a reaction member,
means for successively connecting each said output member to said output means to drive said output means through a preselected speed range,
means for disconnecting each said output member from the output means after the other output member has been connected thereto, and
speed-varying means in driving engagement with said reaction member and with one said output member,
said means for successively connecting said means for disconnecting, comprising:
first clutch means for releasably connecting each said output member directly to said output means, a reduction gear train connected to said output means, and
second clutch means for releasably connecting at least one said output member to said reduction gear train,
said speed-varying means comprising:
a first hydraulic unit in driving engagement with said reaction member, and
a second hydraulic unit of variable displacement in driving engagement with one said output member and hydraulically connected to said first hydraulic unit, one said hydraulic unit serving as a pump while the other one serves as a motor, and vice versa, said first hydraulic unit comprising:

a rotatable shaft in driving relation to said reaction member, a rotary member secured to said rotatable shaft, releasable means for locking said rotatable shaft against rotation when said first hydraulic unit is at zero speed, said first and second clutch means comprising dog-type clutches.

73. The transmission of claim 72 having clutch means for releasably connecting together two of said members of said planetary gear assembly.

* * * * *

UNITED STATES PATENT OFFICE
CERTIFICATE OF CORRECTION

PATENT NO. : 3,866,490
DATED : February 18, 1975
INVENTOR(S) : Elias Orshansky, Jr.

It is certified that error appears in the above-identified patent and that said Letters Patent are hereby corrected as shown below:

Col. 1, line 59, "patht" should read --path--.
Col. 2, line 20, "gera" should read --gear--;
      lines 37-38, "the engine programming" should read
            --by programming--;
      line 38, "theengine" should read --the engine--.
Col. 3, line 14, "asembly" should read --assembly--.
Col. 4, line 68, "speed rate" should read --speed rated--.
Col. 5, line 12, "asembly" should read --assembly--.
Col. 7, line 25, "mmember" should read --member--.
Col. 9, line 7, "Simulltaneously" should read --Simultaneously--
Col. 10, line 10, "shown" should read --shows--.
      line 32, "attained" should read --retained--.
      line 66, "of Fig. 7" should read --the Fig. 7--.
Col. 11, line 52, "having a ring" should read --being a ring--.
Col. 13, line 10, "The transmission" should read
            --The transmissions--.
      line 54, "and other unit" should read
            --the other unit--.
Col. 15, line 1, "decreases" should read --increases--.
Col. 16, line 38, "brake" should read --brake 133--.
Col. 17, line 67, "clutch 137" should read --brake 137--.
Col. 19, line 38, which is line 2 of claim 12, "output member"
            should read --output members--.
Col. 23, line 4, which is line 4 of claim 39, "contacct"
            should read --contact--.
Col. 25, line 57, which is line 7 of claim 57, "carrier both"
            should read --carrier carrying both--.
Col. 28, line 32, which is line 1 of claim 70, "wherein"
            should read --having--.
      line 53, which is line 16 of claim 72, "connecting said
      means" should read --connecting and said means--.

Signed and Sealed this ninth Day of December 1975

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,866,490

DATED : February 18, 1975

INVENTOR(S) : Elias Orshansky, Jr.

It is certified that error appears in the above-identified patent and that said Letters Patent are hereby corrected as shown below:

Column 9, delete the sentence "In the top range...65 miles per hour." that begins on line 30 and ends on line 34, and replace it with the following sentence: --See Fig. 6.--.

Signed and Sealed this

Twenty-first Day of March 1978

[SEAL]

Attest:

RUTH C. MASON  
Attesting Officer

LUTRELLE F. PARKER  
Acting Commissioner of Patents and Trademarks